(12) United States Patent
Takizawa et al.

(10) Patent No.: US 10,730,474 B2
(45) Date of Patent: Aug. 4, 2020

(54) GAS GENERATOR

(71) Applicant: NIPPON KAYAKU KABUSHIKI KAISHA, Chiyoda-ku (JP)

(72) Inventors: Haruki Takizawa, Himeji (JP); Shinya Ueda, Himeji (JP); Satoshi Ohsugi, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 0 days.

(21) Appl. No.: 16/078,113

(22) PCT Filed: Feb. 23, 2017

(86) PCT No.: PCT/JP2017/006857
§ 371 (c)(1),
(2) Date: Aug. 21, 2018

(87) PCT Pub. No.: WO2017/146158
PCT Pub. Date: Aug. 31, 2017

(65) Prior Publication Data
US 2019/0023220 A1    Jan. 24, 2019

(30) Foreign Application Priority Data

Feb. 23, 2016   (JP) ................................. 2016-032426
Apr. 6, 2016    (JP) ................................. 2016-076624

(51) Int. Cl.
*B60R 21/264*    (2006.01)
*B60R 21/26*     (2011.01)

(52) U.S. Cl.
CPC . *B60R 21/2644* (2013.01); *B60R 2021/26011* (2013.01); *B60R 2021/26029* (2013.01); *B60R 2021/26076* (2013.01)

(58) Field of Classification Search
CPC . B60R 21/217; B60R 21/264; B60R 21/2644; B60R 2021/26011; B60R 2021/26029; B01J 7/00
(Continued)

(56) References Cited

U.S. PATENT DOCUMENTS 6,234,521 B1 *  5/2001  Katsuda ............. B01D 46/2411
                                                280/736
7,398,996 B2 *  7/2008  Saito ................... B60R 21/2644
                                                280/741
(Continued)

FOREIGN PATENT DOCUMENTS

JP        1-172047 A    7/1989
JP        8-1005 U      6/1996
(Continued)

OTHER PUBLICATIONS

International Search Report dated Apr. 4, 2017, in PCT/JP2017/006857, filed Feb. 23, 2017.
(Continued)

*Primary Examiner* — Stephen Johnson
*Assistant Examiner* — Benjamin S Gomberg
(74) *Attorney, Agent, or Firm* — Oblon, McClelland, Maier & Neustadt, L.L.P.

(57) ABSTRACT

A gas generator includes a plurality of gas discharge openings arranged in a circumferential wall portion along a circumferential direction as not overlapping with each other. The plurality of gas discharge openings consist of one group or two or more groups of first gas discharge openings, one group or two or more groups of second discharge openings, and one group or two or more groups of third gas discharge openings. The gas discharge openings included in each of the groups of first to third gas discharge openings are set to be opened at an identical opening pressure. The second gas
(Continued)

discharge openings are higher in opening pressure than the first gas discharge openings and lower in opening pressure than the third gas discharge openings. The gas discharge openings included in each group of gas discharge openings are evenly arranged in rotation symmetry at an angle not greater than 120°.

5 Claims, 12 Drawing Sheets

(58) Field of Classification Search
USPC ........ 102/530, 531, 704; 280/736, 739, 740, 280/741, 742
See application file for complete search history.

(56) References Cited

U.S. PATENT DOCUMENTS

| | | | | |
|---|---|---|---|---|
| 7,722,078 | B2* | 5/2010 | Yamazaki | B60R 21/261 280/739 |
| 8,740,245 | B2* | 6/2014 | Fukawatase | B60R 21/2644 280/736 |
| 2001/0033075 | A1* | 10/2001 | Soderquist | B60R 21/26 280/736 |
| 2002/0190511 | A1* | 12/2002 | Watase | B60R 21/2644 280/740 |
| 2004/0135356 | A1* | 7/2004 | Katsuda | B60R 21/203 280/739 |
| 2007/0085314 | A1* | 4/2007 | Matsuda | B60R 21/261 280/740 |
| 2007/0235988 | A1* | 10/2007 | Boyd | B60R 21/2037 280/728.2 |
| 2008/0143088 | A1 | 6/2008 | Yamazaki | |
| 2009/0115175 | A1* | 5/2009 | Nishimura | B60R 21/2644 280/741 |
| 2013/0200600 | A1* | 8/2013 | Bierwirth | B60R 21/261 280/740 |
| 2016/0052482 | A1 | 2/2016 | Bierwirth et al. | |
| 2017/0043742 | A1* | 2/2017 | Ueda | B60R 21/264 |
| 2018/0312132 | A1* | 11/2018 | Ohsugi | B60R 21/264 |

FOREIGN PATENT DOCUMENTS

| | | |
|---|---|---|
| JP | 2001-206189 A | 7/2001 |
| JP | 2008-149873 A | 7/2008 |
| JP | 2009-532649 A | 9/2009 |
| WO | WO 2015/163290 A1 | 10/2015 |

OTHER PUBLICATIONS

Japanese Office Action dated Oct. 15, 2019 in Patent Application No. 2016-076624 (with English translation), 14 pages.

* cited by examiner (A)  ← 123

(B)  ← 223

(C)  ← 323

(D)  ← 423

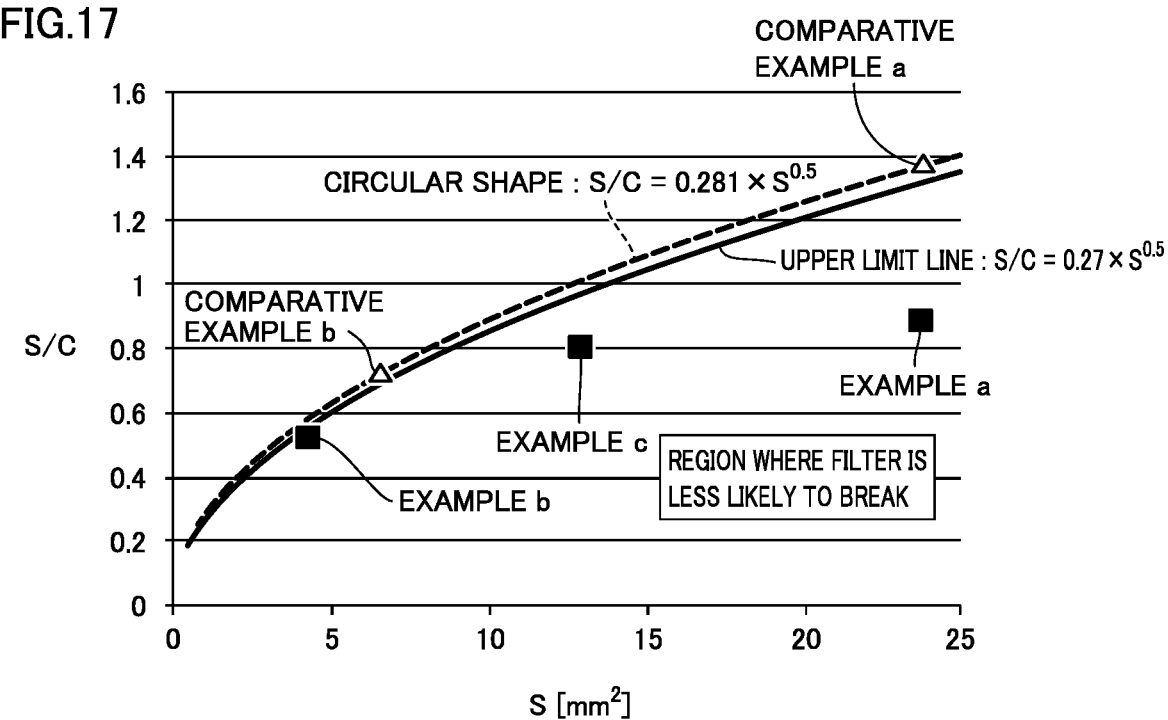

GAS GENERATOR

TECHNICAL FIELD

The present invention relates to a gas generator incorporated in a passenger protection apparatus which protects a driver and/or a passenger at the time of collision of a vehicle or the like, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Gas generators of various structures are available. A disc-type gas generator in a substantially short columnar shape relatively great in outer diameter is available as a gas generator suitably used for an air bag apparatus on a driver's seat side or an air bag apparatus on a passenger's seat side, and a cylinder-type gas generator in a substantially long columnar shape relatively small in outer diameter is available as a gas generator suitably used for a side air bag apparatus, a curtain air bag apparatus, and a knee air bag apparatus.

As described in Japanese Patent Laying-Open No. 1-172047 (PTD 1), for example, a disc-type gas generator including a housing including an upper shell (a closure shell) and a lower shell (an initiator shell) and a filter provided inside the housing, a plurality of gas discharge openings for discharging gas through the filter being provided in a circumferential direction of the upper shell, has been known as the disc-type gas generator.

It is important for a gas generator to burn a gas generating agent continually in a stable manner at the time of activation. In order to burn the gas generating agent continually in a stable manner, the gas generating agent should be placed in a prescribed high-pressure environment. Therefore, the gas generator is designed to narrow a size of a plurality of gas discharge openings provided in the housing to a desired size so that a pressure in a space in a housing is raised to a considerable level at the time of activation.

Output characteristics of the gas generator, however, are affected by an ambient environment in which the gas generator is placed, and particularly dependent on an environmental temperature. The output characteristics tend to be enhanced in a high-temperature environment and weakened in a low-temperature environment. In the high-temperature environment, gas is discharged earlier and more strongly, and in the low-temperature environment, the gas is discharged more slowly and weakly. Therefore, in particular in the low-temperature environment, significant drop in pressure in the housing due to opening of the gas discharge openings tends to occur, continual burning of the gas generating agent may be impeded, and gas output may be insufficient.

In order to lessen difference in gas output performance due to an environmental temperature, for example, International Publication WO2015/163290 (PTD 2) discloses a disc-type gas generator constructed to include a plurality of gas discharge openings different in opening pressure provided in a housing. In the gas generator constructed as such, the plurality of gas discharge openings are opened stepwise with increase in pressure in a space inside the housing.

Therefore, as compared with a gas generator constructed such that all gas discharge openings are opened in unison with increase in pressure in a space inside a housing, significant drop in increase in internal pressure in particular in a low-temperature environment can be prevented. Therefore, a gas generating agent can burn continually in any temperature environment from a high-temperature environment to a low-temperature environment, and consequently a difference in gas output performance attributed to an environmental temperature can be lessened.

FIGS. 10 to 12 of PTD 2 disclose a disc-type gas generator constructed such that a plurality of gas discharge openings are opened in three stages with increase in pressure in the space inside the housing at the time of activation by providing in a circumferential wall portion of the housing, the plurality of gas discharge openings of which opening pressures are set in three stages. When general specifications required of a disc-type gas generator are taken into consideration, the gas generator is preferably set such that the plurality of gas discharge openings are opened in three stages.

CITATION LIST

Patent Document

PTD 1: Japanese Patent Laying-Open No. 1-172047
PTD 2: International Publication WO2015/163290

SUMMARY OF INVENTION

Technical Problem

In recent years, a gas generator has strongly been required to be smaller in size and lighter in weight. In order to reduce a size and a weight of the gas generator, it is effective to decrease a thickness of a housing which is a pressure-resistant container. When a thickness of the housing is simply made smaller, however, pressure-resistant performance of the housing cannot sufficiently be secured. Therefore, in order to reduce a size and a weight of the gas generator, a pressure in the space inside the housing at the time of activation should essentially be lowered to a considerable extent within such a range that the gas generating agent can continually burn in a stable manner.

In order to lower a pressure in the space inside the housing at the time of activation, a total opening area of a plurality of provided gas discharge openings can be increased. When an opening area of an individual gas discharge opening is simply increased, however, force of sucking out the filter through the gas discharge opening at the time of activation will become greater. Then, not only the filter may be broken but also a pressure in the space inside the housing cannot be raised. Therefore, it is effective to increase the number of gas discharge openings while an opening area of the individual gas discharge opening provided in the housing is suppressed.

According to such a construction, however, time and efforts for machining are required and manufacturing cost will increase. Another solution may be increase in clearance between the filter and the gas discharge opening. According to such a construction, however, the housing increases in size as a whole and the object to reduce a weight and manufacturing costs cannot basically be achieved.

In the disc-type gas generator disclosed in FIGS. 10 to 12 of PTD 2, eight gas discharge openings in total are simply provided in the circumferential wall portion of the housing. Therefore, there is a room for improvement in reduction in size and weight of the gas generator.

In addition, in the disc-type gas generator disclosed in FIGS. 10 to 12 of PTD 2, eight gas discharge openings in total are evenly provided along a circumferential direction of the circumferential wall portion of the housing, two gas discharge openings lowest in opening pressure are arranged in rotation symmetry at 180[°] around an axial line of the circumferential wall portion of the housing; four gas discharge openings next lowest in opening pressure are arranged in rotation symmetry at 90[°] around the axial line of the circumferential wall portion of the housing; and two gas discharge openings highest in opening pressure are arranged in rotation symmetry at 180[°] around the axial line of the circumferential wall portion of the housing.

At the time of activation of the gas generator, large thrusts are applied to the gas generator by gas discharged through the gas discharge openings. Therefore, if fixing force of a fixing member (for example, a retainer of an air bag apparatus) which fixes the gas generator is insufficient (for example, lowering in fixing force due to aging), safety at the time of activation may not be ensured.

In this connection, in the disc-type gas generator disclosed in FIGS. 10 to 12 of PTD 2, gas discharge openings which are simultaneously opened are arranged at opposing positions with the axial line of the circumferential wall portion of the housing being interposed therebetween. Therefore thrusts applied to the gas generator by the gas discharged through the gas discharge openings cancel each other, which is substantially equivalent to such a state that no external force is applied to the disc-type gas generator and safety at the time of activation can basically be ensured.

Immediately after two gas discharge openings lowest in opening pressure are opened (see FIG. 12 (A) of PTD 2), however, the gas is discharged only at two positions in the circumferential direction of the circumferential wall portion of the housing. Therefore, if fixing force of the fixing member which fixes the gas generator is insufficient only at some positions in the circumferential direction of the housing, thrusts applied to the gas generator tend to be unbalanced. If the thrusts are unbalanced, large external force is consequently applied to the disc-type gas generator, and there is further a room for improvement in this regard.

Immediately after four gas discharge openings next lowest in opening pressure are opened (see FIG. 12 (B) of PTD 2) as well, the gas is discharged unevenly as being concentrated at two positions in the circumferential direction of the circumferential wall portion of the housing. Therefore, similarly to the above, there is further a room for improvement.

Additionally, at the time point immediately after the two gas discharge openings lowest in opening pressure are opened or immediately after the four gas discharge openings next lowest in opening pressure are opened, the air bag has not yet sufficiently been developed and hence the opened gas discharge openings and the air bag are very close to each other. Since the disc-type gas generator disclosed in FIGS. 10 to 12 of PTD 2 is constructed such that the gas is discharged from the two positions in the circumferential direction of the circumferential wall portion of the housing or two positions uneven in the circumferential direction including these positions, the discharged gas at a high temperature and a high pressure may impinge on a local portion of the air bag in a concentrated manner, and consequently the air bag may be damaged. There is a room for improvement also in this regard.

In application of such a construction that the number of gas discharge openings is increased while an opening area of the individual gas discharge opening provided in the housing described above is suppressed to the disc-type gas generator disclosed in FIGS. 10 to 12 of PTD 2 in order to reduce a size and a weight of the gas generator as well, performance of the gas generator will significantly be different depending on in which order and at which position the plurality of gas discharge openings increased in number are arranged in the circumferential wall portion of the housing.

Therefore, a first object of the present invention is to provide a gas generator capable of achieving reduction in size and weight, lessening a difference in gas output performance attributed to an environmental temperature, and improving safety at the time of activation and lessening damage to an air bag.

A second object of the present invention is to provide a gas generator capable of achieving reduction in weight and manufacturing cost while breakage of a filter at the time of activation is suppressed even when a gas discharge opening is as large in opening area as in a conventional example.

Solution to Problem

A gas generator based on a first aspect of the present invention includes a housing, a gas generating agent, an igniter, and a sealing member. The housing has a cylindrical circumferential wall portion provided with a plurality of gas discharge openings and has one end portion and the other end portion in an axial direction of the circumferential wall portion closed. The gas generating agent is arranged in an accommodation space located in the housing. The igniter serves to burn the gas generating agent and is assembled to the housing. The sealing member closes the plurality of gas discharge openings. The plurality of gas discharge openings consist of a plurality of groups of gas discharge openings. The plurality of groups of gas discharge openings include only one group or two or more groups of first gas discharge openings consisting of a plurality of first gas discharge openings set to be opened at an identical first opening pressure and evenly arranged along a circumferential direction of the circumferential wall portion in rotation symmetry at an angle not greater than 120[°] around an axial line of the circumferential wall portion, one group or two or more groups of second gas discharge openings consisting of a plurality of second gas discharge openings set to be opened at an identical second opening pressure and evenly arranged along the circumferential direction of the circumferential wall portion in rotation symmetry at an angle not greater than 120[°] around the axial line of the circumferential wall portion, and one group or two or more groups of third gas discharge openings consisting of a plurality of third gas discharge openings set to be opened at an identical third opening pressure and evenly arranged along the circumferential direction of the circumferential wall portion in rotation symmetry at an angle not greater than 120[°] around the axial line of the circumferential wall portion. The second opening pressure is higher than the first opening pressure. The third opening pressure is higher than the second opening pressure. The plurality of gas discharge openings are arranged as not overlapping with each other in the circumferential direction of the circumferential wall portion.

The gas discharge openings described above are grouped such that gas discharge openings as many as possible form one group of gas discharge openings. For example, when four gas discharge openings identical in opening pressure are evenly provided along the circumferential direction of the circumferential wall portion of the housing, the four gas discharge openings can also be regarded as consisting of two groups in total of gas discharge openings which consist of a group of gas discharge openings consisting of two gas discharge openings arranged in rotation symmetry at 180[°] and a group of gas discharge openings consisting of two gas discharge openings arranged in rotation symmetry at 180[°]. The four gas discharge openings, however, are not regarded as such, but in this case, they are regarded as consisting of one group of gas discharge openings consisting of four gas discharge openings arranged in rotation symmetry at 90[°].

In the gas generator based on the first aspect of the present invention, preferably, the sealing member is formed of at least one sealing tape attached to an inner circumferential surface of the circumferential wall portion. In that case, preferably, a plurality of wall regions where a linear dimension between end portions of gas discharge openings adjacent in the circumferential direction of the circumferential wall portion among the plurality of gas discharge openings is not smaller than 7.0 [mm] are provided in the circumferential wall portion along the circumferential direction of the circumferential wall portion, and preferably, a pair of end portions of the sealing tape located in a direction of extension is located in any of the plurality of wall regions.

In the gas generator based on the first aspect of the present invention, preferably, the sealing tape is implemented by a single sealing tape in a form of a band attached to the inner circumferential surface of the circumferential wall portion such that the direction of extension thereof is identical to the circumferential direction of the circumferential wall portion. In that case, a pair of end portions of one sealing tape in the form of the band located in the direction of extension is preferably located in any one of the plurality of wall regions.

In the gas generator based on the first aspect of the present invention, all of the plurality of gas discharge openings may be arranged as aligned along the circumferential direction of the circumferential wall portion.

In the gas generator based on the first aspect of the present invention, preferably, at least any of the plurality of first gas discharge openings, the plurality of second gas discharge openings, and the plurality of third gas discharge openings is in a shape of an elongated hole greater in opening width along an axial direction of the circumferential wall portion than along the circumferential direction of the circumferential wall portion.

In the gas generator based on the first aspect of the present invention, preferably, all of remaining gas discharge openings except for gas discharge openings included in the group of third gas discharge openings among the plurality of gas discharge openings are evenly arranged along the circumferential direction of the circumferential wall portion.

In the gas generator based on the first aspect of the present invention, preferably, a sum of opening areas of the plurality of first gas discharge openings is smaller than a total sum of a sum of opening areas of the plurality of second gas discharge openings and a sum of opening areas of the plurality of third gas discharge openings.

In the gas generator based on the first aspect of the present invention, preferably at least any of the plurality of first gas discharge openings, the plurality of second gas discharge openings, and the plurality of third gas discharge openings is in such a shape that S and C satisfy a condition of $S/C \leq 0.27 \times S^{0.5}$ where S [mm$^2$] represents an opening area of one gas discharge opening and C [mm] represents a circumferential length of the one gas discharge opening.

A gas generator based on a second aspect of the present invention includes a housing made of a metal, the housing including an upper shell in which a plurality of gas discharge openings are disposed and a lower shell, a sealing member which closes the plurality of gas discharge openings in the inside of the housing, a filter provided in a circumferential direction in the inside of the housing, a combustion chamber defined in the inside of the housing by a space surrounded by an inner wall surface of the lower shell, an inner wall surface of the upper shell, and an inner wall surface of the filter, a gas generating agent accommodated in the combustion chamber, the gas generating agent generating gas as it burns, and an igniter assembled to the lower shell, the igniter igniting and burning the gas generating agent. At least one of the plurality of gas discharge openings is in such a shape as satisfying a condition of $S/C < 0.27 \times S^{0.5}$ where S [mm$^2$] represents an opening area of the one gas discharge opening and C [mm] represents a circumferential length of the one gas discharge opening. When an opening shape of the gas discharge opening is circular, a condition of $S/C < 0.281 \times S^{0.5}$ is satisfied.

According to the construction, even when the gas discharge opening is as large in opening area as in the conventional example, reduction in weight and manufacturing cost can be achieved while breakage of the filter at the time of activation is suppressed. With a gas discharge opening simply in a circular shape not according to the construction, a circumferential length of the gas discharge opening cannot be changed. According to the construction, however, a circumferential length of the gas discharge opening can be changed with respect to an opening area of the gas discharge opening. Therefore, a rupturing pressure of a closing member can also be controlled. By balancing an opening area of the gas discharge opening and a thickness of the housing, a gas generator which achieves reduction in weight and manufacturing cost as compared with the conventional example and operates safely at the time of activation can be obtained.

In the gas generator based on the second aspect of the present invention, preferably, the one gas discharge opening has an opening shape of any of an elongated shape, a substantially T shape, and a substantially V shape.

According to the construction, a gas generator can readily be manufactured while the effect described above is obtained.

In the gas generator based on the second aspect of the present invention, preferably, the one gas discharge opening has such an opening shape that two or more elongated holes intersect with each other.

According to the construction, a gas generator can readily be manufactured while the effect described above is obtained.

In the gas generator based on the second aspect of the present invention, at least two of the plurality of gas discharge openings may each have such a shape as satisfying a condition of $S/C < 0.27 \times S^{0.5}$, and in that case, at least one gas discharge opening having a circular opening shape may be provided at a position between the two gas discharge openings.

According to the construction, a gas generator various in output characteristics can be obtained while the effect above is achieved.

Advantageous Effects of Invention

According to the first aspect of the present invention described above, a gas generator capable of achieving reduction in size and weight, lessening a difference in gas output performance attributed to an environmental temperature, and improving safety at the time of activation and lessening damage to an air bag can be provided.

According to the second aspect of the present invention described above, a gas generator capable of achieving reduction in weight and manufacturing cost while breakage of a filter at the time of activation is suppressed even when a gas discharge opening is as large in opening area as in the conventional example can be provided.

BRIEF DESCRIPTION OF DRAWINGS

FIG. 14 is a schematic construction diagram of the disc-type gas generator shown in FIG. 13, of which part is seen through.

FIG. 17 shows a prescribed graph in which values derived from an opening shape of each of gas discharge openings in disc-type gas generators according to Examples a, b, and c and Comparative Examples a and b are plotted.

DESCRIPTION OF EMBODIMENTS

Figure 1:
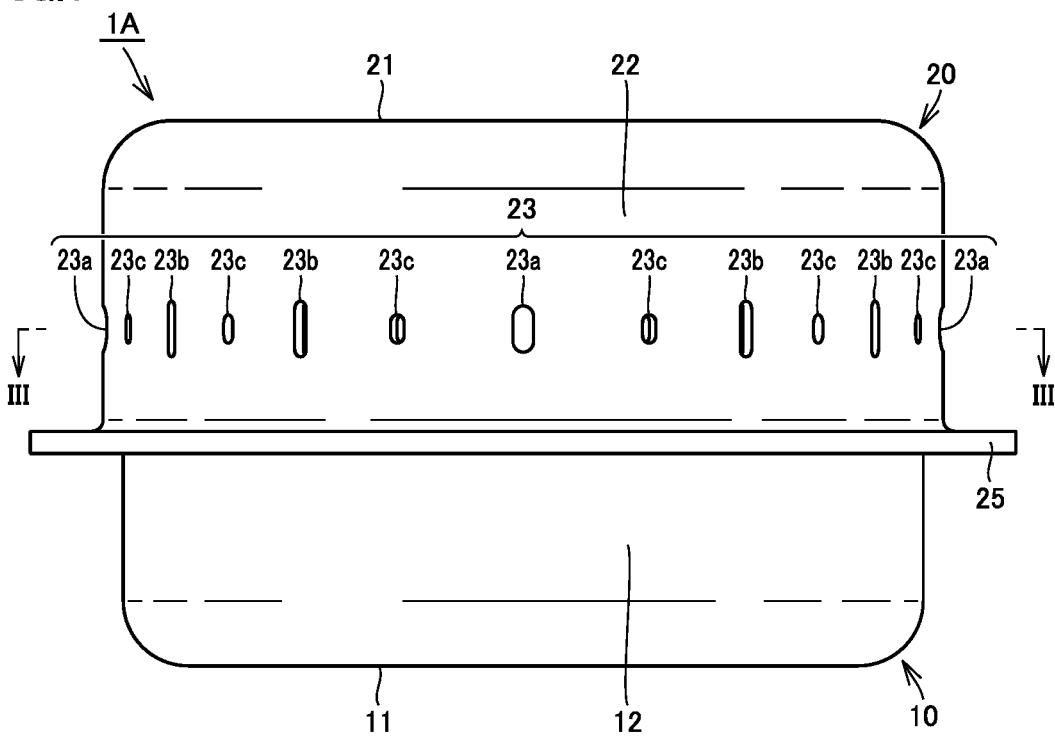
FIG. 1 is a front view or a disc-type gas generator in a first embodiment of the present invention.

An embodiment of the present invention will be described hereinafter in detail with reference to the drawings. An embodiment shown below represents application of the present invention to a disc-type gas generator suitably incorporated in an air bag apparatus equipped in a steering wheel or the like of a car. The same or common elements in the embodiment shown below have the same reference characters allotted in the drawings and description thereof will not be repeated.

First Embodiment

Figure 2:
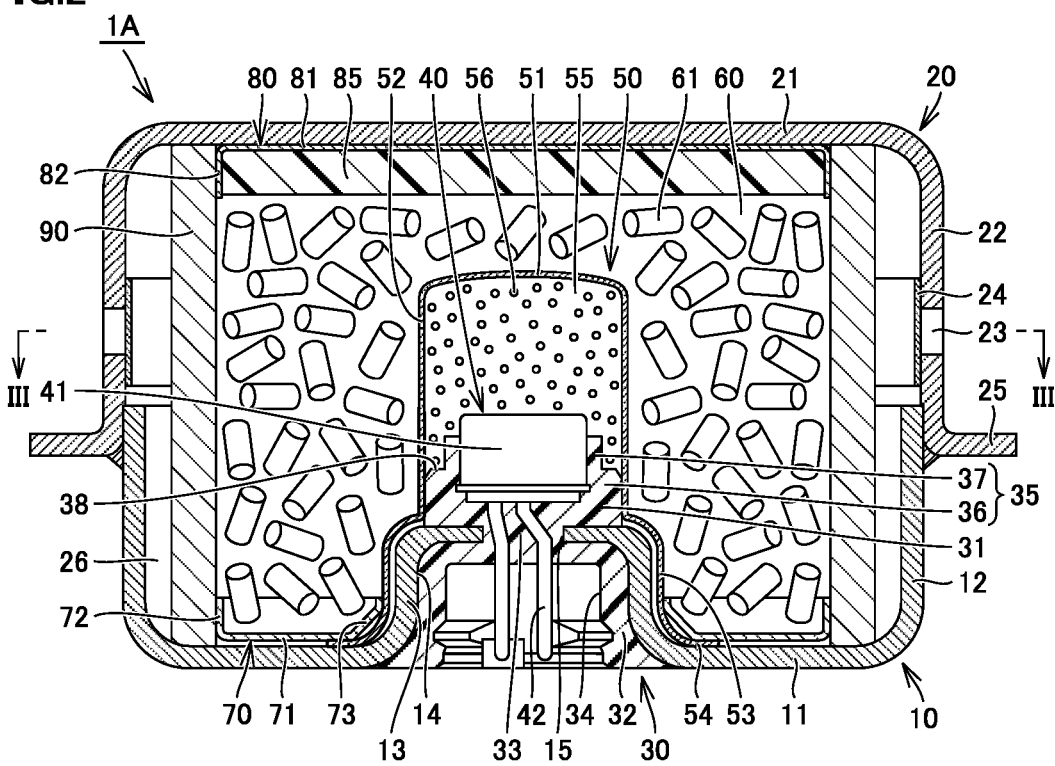
FIG. 2 is a schematic cross-sectional view of the disc-type gas generator shown in FIG. 1.

FIG. 1 is a front view of a disc-type gas generator in an embodiment of the present invention and FIG. 2 is a schematic cross-sectional view of the disc-type gas generator shown in FIG. 1. A construction of a disc-type gas generator 1A in the present embodiment will initially be described with reference to FIGS. 1 and 2.

As shown in FIGS. 1 and 2, disc-type gas generator 1A in the present embodiment has a short substantially cylindrical housing having axial one and the other ends closed, and is constructed to accommodate as internal construction components in an accommodation space provided in the housing, a holding portion 30, an igniter 40, a cup-shaped member 50, an enhancer agent 56, a gas generating agent 61, a lower supporting member 70, an upper supporting member 80, a cushion 85, a filter 90, and the like. In the accommodation space provided in the housing, a combustion chamber 60 mainly accommodating gas generating agent 61 among the internal construction components described above is located.

The short substantially cylindrical housing includes a lower shell (an initiator shell) 10 and an upper shell (a closure shell) 20. Each of lower shell 10 and upper shell 20 is made, for example, of a press-formed product formed by press-working a plate-shaped member made of a rolled metal. A metal plate composed, for example, of stainless steel, iron steel, an aluminum alloy, a stainless alloy, or the like is made use of as the plate-shaped member made of metal which forms lower shell 10 and upper shell 20, and what is called a high tensile steel plate which is free from such a failure as fracture even at the time of application of tensile stress not lower than 440 [MPa] and not higher than 780 [MPa] is suitably made use of Press-working may be performed by hot forging or cold forging, however, from a point of view of improvement in dimension accuracy, it is more suitably performed by cold forging.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a circumferential wall portion 12 and upper shell 20 has a top plate portion 21 and a circumferential wall portion 22. The axial one and the other end portions of the housing are thus closed by top plate portion 21 and bottom plate portion 11. Electron-beam welding, laser welding, friction welding, or the like is suitably made use of for joining lower shell 10 and upper shell 20 to each other.

Upper shell 20 further includes a fixing portion 25 erected outward as being continuous from a lower end of circumferential wall portion 22. Fixing portion 25 is a portion for fixing the housing to an external member (not shown) so that disc-type gas generator 1A is supported by the external member after installation. Upper shell 20 has a thickness preferably not greater than 2.0 [mm] and more preferably not greater than 1.8 [mm].

As shown in FIG. 2, a protruding cylindrical portion 13 protruding toward top plate portion 21 is provided in a central portion of bottom plate portion 11 of lower shell 10 so that a depression portion 14 is formed in the central portion of bottom plate portion 11 of lower shell 10. Protruding cylindrical portion 13 is a site to which igniter 40 is fixed with holding portion 30 described above being interposed, and depression portion 14 is a site serving as a space for providing a female connector portion 34 in holding portion 30. Lower shell 10 has a thickness preferably not greater than 2.0 [mm] and more preferably not greater than 1.8 [mm].

Protruding cylindrical portion 13 is formed to be in a substantially cylindrical shape with bottom, and an opening 15 in a non-point-symmetrical shape (for example, in a D shape, a barrel shape, or an elliptical shape) when viewed two-dimensionally is provided at an axial end portion located on a side of top plate portion 21. Opening 15 is a site through which a pair of terminal pins 42 of igniter 40 passes.

Lower shell 10 and upper shell 20 are made by press-working a member in a form or a plate made of a rolled metal as described above. Specifically, lower shell 10 and upper shell 20 are made, for example, by using a pair of dice consisting of an upper die and a lower die and vertically pressing a member in a form or a plate made of a rolled sheet of metal to form the plate in a shape as illustrated.

Igniter 40 serves to produce flames and includes an ignition portion 41 and a pair of terminal pins 42 described above. Ignition portion 41 contains an ignition agent producing flames by being ignited to burn at the time of activation and a resistor for igniting this ignition agent. The pair of terminal pins 42 is connected to ignition portion 41 for igniting the ignition agent.

More specifically, ignition portion 41 includes a squib cup formed like a cup and a base portion closing an opening end of the squib cup and holding a pair of terminal pins 42 as being inserted therein. The resistor (bridge wire) is attached to couple tip ends of the pair of terminal pins 42 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup and the base portion described above are generally made of a metal or plastic.

Upon sensing collision, a prescribed amount of current flows in a resistor through terminal pin 42. As the prescribed amount of current flows in the resistor, Joule heal is generated in the resistor and the ignition agent starts burning. Flame at a high temperature caused by burning bursts the squib cup accommodating the ignition agent. A time period from flow of a current in the resistor until activation of igniter 40 is generally not longer than 2 milliseconds in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, holding portion 30 formed from a resin molded portion is provided around protruding cylindrical portion 13 provided in bottom plate portion 11, and igniter 40 is fixed to bottom plate portion 11 as being held by holding portion 30.

Opening 15 provided in protruding cylindrical portion 13 is smaller in size than an outer geometry of ignition portion 41 which is a portion greatest in outer geometry in igniter 40. According to such a construction, even when an unexpected breakage is caused in holding portion 30, igniter 40 can be prevented from passing through opening 15 to move out of the housing in response to increase in pressure in the inside of the housing and a safe operation of disc-type gas generator 1A can be ensured.

Holding portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 of lower shell 10 and solidifying the fluid resin material.

Igniter 40 is fixed to bottom plate portion 11 with holding portion 30 being interposed, in such a manner that terminal pin 42 is introduced from the inside of lower shell 10 to pass through opening 15 during molding of holding portion 30 and the fluid resin material described above is fed to fill a space between igniter 40 and lower shell 10 in this state.

For a source material for holding portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 30 after molding, glass fibers or the like are preferably contained as fillers in these resin materials. In a case where sufficient mechanical strength can be ensured only by a thermoplastic resin, however, a filler as described above does not have to be added.

Holding portion 30 has an inner cover portion 31 covering a part of an inner surface of bottom plate portion 11 of lower shell 10, an outer cover portion 32 covering a part of an outer surface of bottom plate portion 11 of lower shell 10, and a coupling portion 33 located within opening IS provided in bottom plate portion 11 of lower shell 10 and continuing to each of inner cover portion 31 and outer cover portion 32.

Holding portion 30 is secured to bottom plate portion 11 at a surface on a side of bottom plate portion 11, of each of inner cover portion 31, outer cover portion 32, and coupling portion 33. Holding portion 30 is secured at each of a side surface and a lower surface of igniter 40 which is closer to a lower end of ignition portion 41, as well as a surface of a portion of igniter 40 which is closer to an upper end of terminal pin 42. Thus, opening 15 is completely buried by terminal pin 42 and holding portion 30, so that hermeticity of the space in the housing is ensured by sealability ensured in that portion. Since opening 15 is in a non-point-symmetrical shape in a plan view as described above, opening 15 and coupling portion 33 function also as a turning prevention mechanism which prevents fixing portion 30 from turning with respect to bottom plate portion 11 by burying opening 15 with coupling portion 33.

Inner cover portion 31 of holding portion 30 is provided to cover only an axial end portion of protruding cylindrical portion 13 provided in bottom plate portion 11 so that an outer circumferential surface of protruding cylindrical portion 13 located in the housing is exposed without being covered with holding portion 30.

Holding portion 30 includes as a part of inner cover portion 31, an annular cover portion 35 which covers an outer circumferential surface of the squib cup of igniter 40. Annular cover portion 35 is provided with a lower annular cover portion 36 and an upper annular cover portion 37 as a result of formation of a stepped shape which defines a step-forming surface 38. Specifically, lower annular cover portion 36 is provided to cover a lower portion of the squib cup of igniter 40 and upper annular cover portion 37 is provided to cover the squib cup up to an intermediate height position thereof which is above lower annular cover portion 36. Upper annular cover portion 37 is smaller in thickness along a radial direction than lower annular cover portion 36. Annular cover portion 35 is thus formed in a stepped shape with step-forming surface 38 substantially annular in a plan view which is substantially orthogonal to the axial direction of the squib cup of igniter 40, and ignition portion 41 of igniter 40 is held by annular cover portion 35 with the stepped shape in the radial direction.

Lower annular cover portion 36 is a site mainly provided to exhibit holding force for preventing igniter 40 from coming or from holding portion 30 even when disc-type gas generator 1A operates Upper annular cover portion 37 is a site mainly provided to receive an impact caused by activation of igniter 40 when disc-type gas generator 1A operates.

According to such a construction, an unintended crack which may unfavorably affect an operation of disc-type gas generator 1A can be prevented from being generated in holding portion 30 itself composed of a resin molding or an interface between holding portion 30, and lower shell 10 and igniter 40 (in particular igniter 40) which are members to which the holding portion is secured, due to an impact caused by activation of igniter 40 when disc-type gas generator 1A operates.

In a portion of outer cover portion 32 of holding portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10. In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established. Female connector portion 34 is composed of a conductive resin and plays a role as a ground terminal. Since the male connector is provided with a ground terminal (not shown) in contact with female connector portion 34, a lead wire for grounding (not shown) of the male connector is grounded to a ground circuit outside disc-type gas generator 1A when the male connector is fitted to female connector portion 34.

Injection molding described above may be carried out with the use of lower shell 10 obtained by providing an adhesive layer in advance at a prescribed position on a surface of bottom plate portion 11 in a portion to be covered with holding portion 30. The adhesive layer can be formed by applying an adhesive in advance to a prescribed position of bottom plate portion 11 and curing the adhesive.

By doing so, the cured adhesive layer is located between bottom plate portion 11 and holding portion 30, so that holding portion 30 formed from a resin molded portion can more firmly be secured to bottom plate portion 11. Therefore, holding portion 30 can be prevented from rotating relative to bottom plate portion 11 after injection molding. By providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing, other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acrylic resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, a polyether sulfone-based resin, a polyarylate-based resin, a polyether ether ketone-based resin, a polyamide imide-based resin a liquid crystal polymer, styrene-based rubber, olefin-based rubber, and the like can be made use of as the adhesive described above.

A position of application of the adhesive is not particularly limited. For example, the adhesive can be applied to the entire outer surface (that is, a surface of bottom plate portion 11 in a portion covered with outer cover portion 32 of holding portion 30) in a portion where protruding cylindrical portion 13 of bottom plate portion 11 is formed or a part thereof or to the entire inner surface (that is, the surface of bottom plate portion 11 in a portion covered with inner cover portion 31 of holding portion 30) in the portion where protruding cylindrical portion 13 of bottom plate portion 11 is formed or a part thereof, or can be applied also to the entire surface of bottom plate portion 11 in a portion covered with holding portion 30.

In igniter 40, an adhesive layer may be provided by applying the adhesive in advance to a prescribed position on the surface of the squib cup of ignition portion 41 which is a portion to be covered with holding portion 30. According to such a construction, as in an example in which the adhesive layer is provided in advance in bottom plate portion 11 described above, igniter 40 can more firmly be secured to holding portion 30 and high sealability can be ensured in that portion.

Though such a construction example that igniter 40 can be fixed to lower shell 10 by injection molding holding portion 30 formed from the resin molded portion is exemplified, other alternative means can also be used for fixing igniter 40 to lower shell 10.

For example, in forming holding portion 30, holding portion 30 may be integrated only with lower shell 10 and igniter 40 may be assembled to formed holding portion 30, for example, by fitting. In that case, since holding portion 30 is secured only to lower shell 10, sealability between holding portion 30 and igniter 40 is not secured only thereby. By subjecting that portion to an appropriate sealing process, for example, by arranging an O ring in that portion, sufficient sealability can be ensured.

Cup-shaped member 50 is assembled to bottom plate portion 11 so as to cover protruding cylindrical portion 13, holding portion 30, and igniter 40. Cup-shaped member 50 has a substantially cylindrical shape with bottom having an open end portion on the side of bottom plate portion 11, and contains an enhancer chamber 55 accommodating enhancer agent 56. Cup-shaped member 50 is arranged to protrude toward combustion chamber 60 accommodating gas generating agent 61, such that enhancer chamber 55 provided therein faces ignition portion 41 of igniter 40.

Cup-shaped member 50 has a top wall portion 51 and a sidewall portion 52 defining enhancer chamber 55 described above and an extension portion 53 extending radially outward from a portion or sidewall portion 52 on a side of an open end. Extension portion 53 is formed to extend along an inner surface of bottom plate portion 11 of lower shell 10. Specifically, extension portion 53 is in a shape curved along a shape of an inner bottom surface of bottom plate portion 11 in a portion where protruding cylindrical portion 13 is provided and in the vicinity thereof and includes a tip end portion 54 extending like a flange in a radially outer portion thereof.

Tip end portion 54 in extension portion 53 is arranged between bottom plate portion 11 and lower supporting member 70 along the axial direction of the housing and sandwiched between bottom plate portion 11 and lower supporting member 70 along the axial direction of the housing. Since lower supporting member 70 is pressed toward bottom plate portion 11 by gas generating agent 61, cushion 85, upper supporting member 80, and top plate portion 21 arranged above, cup-shaped member 50 is in such a state that tip end portion 54 of extension portion 53 is pressed toward bottom plate portion 11 by lower supporting member 70 and fixed to bottom plate portion 11. Thus, cup-shaped member 50 is prevented from falling from bottom plate portion 11 without using caulking or press-fitting for fixing cup-shaped member 50.

A portion on a side of an opening end of sidewall portion 52 of cup-shaped member 50 is fixed by press-fitting to holding portion 30 by being externally attached to inner cover portion 31 which is a portion of holding portion 30 located inside the housing. This site is a site of fixing for facilitating an assembly operation in assembly of cup-shaped member 50 to the housing. Cup-shaped member 50 is fixed to bottom plate portion 11 also by fixing by press-fitting.

Cup-shaped member 50 has an opening in neither of top wall portion 51 and sidewall portion 52 and surrounds enhancer chamber 55 provided therein. This cup-shaped member 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of a resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for cup-shaped member 50.

In addition to the above, a component which is formed from a member made of metal high in mechanical strength as represented by iron or copper, has art opening in sidewall portion 52 thereof, and has a scaling tape adhered to close the opening can also be made use of for cup-shaped member 50. A method of fixing cup-shaped member 50 is not limited to a fixing method using lower supporting member 70 described above, and other fixing methods may be made use of.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition or the like composed of metal powders/oxidizing agent represented by B/KNO$_3$ or the like is employed. For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where cup-shaped member 50 described above is arranged in a space inside the housing made up or lower shell 10 and upper shell 20, combustion chamber 60 accommodating gas generating agent 61 is located. Specifically, as described above, cup-shaped member 50 is arranged to protrude into combustion chamber 60 formed in the housing, and a space provided in a portion of this cup-shaped member 50 facing the outer surface of sidewall portion 52 and a space provided in a portion thereof facing an outer surface of top wall portion 51 are provided as combustion chamber 60.

In a space surrounding combustion chamber 60 accommodating gas generating agent 61 in a radial direction of the housing, filter 90 is arranged along an inner circumference of the housing. Filter 90 has a cylindrical shape and is arranged such that a central axis thereof substantially matches with the axial direction of the housing. Thus, the filter surrounds in the radial direction, combustion chamber 60 where gas generating agent 61 is accommodated.

Gas generating agent 61 is an agent which is ignited by thermal particles generated as a result of activation of igniter 40 and produces a gas as it burns. A non-azide-based gas generating agent is preferably employed as gas generating agent 61, and gas generating agent 61 is formed as a molding generally containing a fuel, an oxidizing agent, and an additive. For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use or In addition, as the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of. Moreover, as the additive, a binder, a slag formation agent, a combustion modifier, or the like is exemplified. As the binder, for example, metal salt of carboxymethyl cellulose, an organic binder such as stearate, or an inorganic binder such as synthetic hydrotalcite and Japanese acid clay can suitably be made use of. As the slag formation agent, silicon nitride, silica, Japanese acid clay, or the like can suitably be made use of. In addition, as the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which disc-type gas generator 1A is incorporated, and for example, a shape optimal for the specifications is preferably selected by selecting a shape allowing change over time of a rate of generation of gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

For example, a filter obtained by winding and sintering a metal wire rod of stainless steel or iron steel, a filter formed by press-working a mesh material into which metal wire rods are knitted to thereby pack the same, a filter obtained by winding a perforated metal plate, or the like is made use of as filter 90. Here, as the mesh material, specifically, a wire gauze of stocking stitch, a plain-woven wire gauze, an aggregate of crimped metal wire rods, or the like is made use of. In addition, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like is made use of. In this case, a size or a shape of a hole to be provided can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 90 functions as cooling means for cooling gas by depriving heat at a high temperature of the gas when the gas produced in combustion chamber 60 passes through this filter 90 and also functions as removal means for removing residues (slag) or the like contained in the gas. Therefore, in order to sufficiently cool the gas and to prevent emission of residues to the outside, the gas generated in combustion chamber 60 should reliably pass through filter 90. Filter 90 is arranged to be distant from circumferential wall portions 12 and 22 so as to provide a gap 26 of a prescribed size between circumferential wall portion 22 of upper shell 20 and circumferential wall portion 12 of lower shell 10 which form the circumferential wall portion of the housing.

As shown in FIGS. 1 and 2, a plurality of gas discharge openings 23 are provided in circumferential wall portion 22 of upper shell 20 in a portion facing filter 90 (that is, circumferential wall portion 22 in a portion located on a side of top plate portion 21 relative to a position where fixing portion 25 is provided). The plurality of gas discharge openings 23 serve for guiding gas which has passed through filter 90 to the outside of the housing.

As shown in FIG. 2, to an inner circumferential surface of circumferential wall portion 22 of upper shell 20, a scaling tape 24 made of a metal as a scaling member is attached to close the plurality of gas discharge openings 23. An aluminum foil or the like having a tacky member applied to its one surface is suitably made use of as this sealing tape 24 and hermeticity of combustion chamber 60 is ensured by sealing tape 24. In the present embodiment, the sealing member is formed of a single sealing tape 24 in a form of a band.

As shown in FIG. 1, in disc-type gas generator 1A in the present embodiment, the plurality of gas discharge openings 23 include three types of gas discharge openings different in shape from one another (that is, a plurality of first gas discharge openings 23a, a plurality of second gas discharge openings 23b, and a plurality of third gas discharge openings 23c). These three types of gas discharge openings are constructed to be different in opening pressure from one another so as to be opened stepwise with increase in pressure in the above-described accommodation space which is a space in the housing as a result of burning of gas generating agent 61 at the time of activation of disc-type gas generator 1A.

Filter 90 and gap 26 are located between combustion chamber 60 and the plurality of gas discharge openings 23 as described above. A flow resistance of filter 90 against gas, however, is relatively low, and hence a pressure in the accommodation space is substantially equal to an internal pressure in combustion chamber 60. Therefore, in the description below, this pressure may also be referred to as the internal pressure in combustion chamber 60 instead of a pressure in the accommodation space.

First gas discharge opening 23a, second gas discharge opening 23b, and third gas discharge opening 23c described above are constructed to be different from one another in opening pressure owing to a difference in shape of opening thereof. By thus including a plurality of types of gas discharge openings 23 different in opening pressure from one another, significant drop in increase in internal pressure in combustion chamber 60 at the time of activation in particular in a low-temperature environment can be prevented and intended combustion characteristics can be obtained. Details thereof and a more detailed construction of the plurality of types of gas discharge openings 23 will be described later.

Referring again to FIG. 2, in the vicinity of the end portion of combustion chamber 60 located on the side of bottom plate portion 11, lower supporting member 70 is arranged. Lower supporting member 70 has an annular shape and is arranged as substantially being applied to filter 90 and bottom plate portion 11 so as to cover a boundary portion between filter 90 and bottom plate portion 11. Thus, lower supporting member 70 is located between bottom plate portion 11 and gas generating agent 61 in the vicinity of the end portion of combustion chamber 60.

Lower supporting member 70 has an abutment portion 72 erected to abut on the inner circumferential surface of the axial end portion of filter 90 located on the side of bottom plate portion 11 and a bottom portion 71 provided to extend radially inward from abutment portion 72. Bottom portion 71 is formed to extend along an inner bottom surface of bottom plate portion 11 of lower shell 10. Specifically, bottom portion 71 is in a shape bent along the shape of the inner bottom surface of bottom plate portion 11 including a portion where protruding cylindrical portion 13 is provided, and includes a tip end portion 73 erected in a radially inward portion thereof.

Lower supporting member 70 functions as flow-out prevention means for preventing gas generated in combustion chamber 60 at the time of activation from flowing out through a gap between the lower end of filter 90 and bottom plate portion 11 without passing through filter 90. Lower supporting member 70 is formed, for example, by press-working a plate-shaped member made of metal, and suitably made of a member formed from a steel plate of common steel, special steel, or the like (such as a cold rolled steel plate or a stainless steel plate).

Tip end portion 54 of extension portion 53 of cup-shaped member 50 described above is arranged between bottom plate portion 11 and bottom portion 71 of lower supporting member 70 along the axial direction of the housing, and thus is held as being sandwiched between bottom plate portion 11 and bottom portion 71 along the axial direction of the housing. Cup-shaped member 50 is thus in such a state that tip end portion 54 of extension portion 53 is pressed toward bottom plate portion 11 by bottom portion 71 of lower supporting member 70 and fixed to bottom plate portion 11.

Upper supporting member 80 is arranged at the end portion of combustion chamber 60 located on the side of top plate portion 21. Upper supporting member 80 is substantially in a shape of a disc and is arranged as being applied to filter 90 and top plate portion 21 so as to cover the boundary portion between filter 90 and top plate portion 21. Thus, upper supporting member 80 is located between top plate portion 21 and gas generating agent 61 in the vicinity of the end portion of combustion chamber 60.

Upper supporting member 80 has a bottom portion 81 abutting on top plate portion 21 and an abutment portion 82 erected from a peripheral edge of bottom portion 81. Abutment portion 82 abuts on the inner circumferential surface of an axial end portion of filter 90 located on the side of top plate portion 21.

Upper supporting member 80 functions as flow-out prevention means for preventing gas generated in combustion chamber 60 at the time of activation from flowing out through a gap between the upper end of filter 90 and top plate portion 21 without passing through filter 90. Similarly to lower supporting member 70, upper supporting member 80 is formed, for example, by press-working a plate-shaped member made of metal, and suitably made of a member formed from a steel plate of common steel, special steel, or the like (such as a cold rolled steel plate or a stainless steel plate).

In this upper supporting member 80, a cushion 85 in a shape of a disc is arranged to be in contact with gas generating agent 61 accommodated in combustion chamber 60. Cushion 85 is thus located between top plate portion 21 and gas generating agent 61 in a portion of combustion chamber 60 on the side of top plate portion 21 and presses gas generating agent 61 toward bottom plate portion 11. This cushion 85 is provided for the purpose of preventing gas generating agent 61 made of a molding from being crushed by vibration or the like, and made of a member suitably formed of a molding of ceramic fibers, rock wool, or a foamed resin (such as foamed silicone, foamed polypropylene, or foamed polyethylene), or rubber represented by chloroprene and EPDM.

An operation of disc-type gas generator 1A in the present embodiment described above will now be described with reference to FIG. 2.

When a vehicle on which disc-type gas generator 1A in the present embodiment is mounted collides, collision sensing means separately provided in the vehicle senses collision, and based thereon, igniter 40 is activated in response to power feed through a control unit separately provided in the vehicle. Enhancer agent 56 accommodated in enhancer chamber 55 is ignited to burn by flames produced as a result of activation of igniter 40, to thereby generate a large amount of thermal particles. Burning of this enhancer agent 56 bursts or melts cup-shaped member 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 90. At that time, heat is deprived of the gas through filter 90 and the gas is cooled, slag contained in the gas is removed by filter 90, and the gas flows into gap 26.

As a pressure in the space in the housing increases, sealing tape 24 which has closed gas discharge opening 23 provided ill upper shell 20 is cleaved and the gas is discharged to the outside of the housing through gas discharge opening 23. The plurality of gas discharge openings 23 are opened stepwise and the discharged gas is introduced in the air bag provided adjacent to disc-type gas generator 1A and it expands and develops the air bag.

Figure 3:
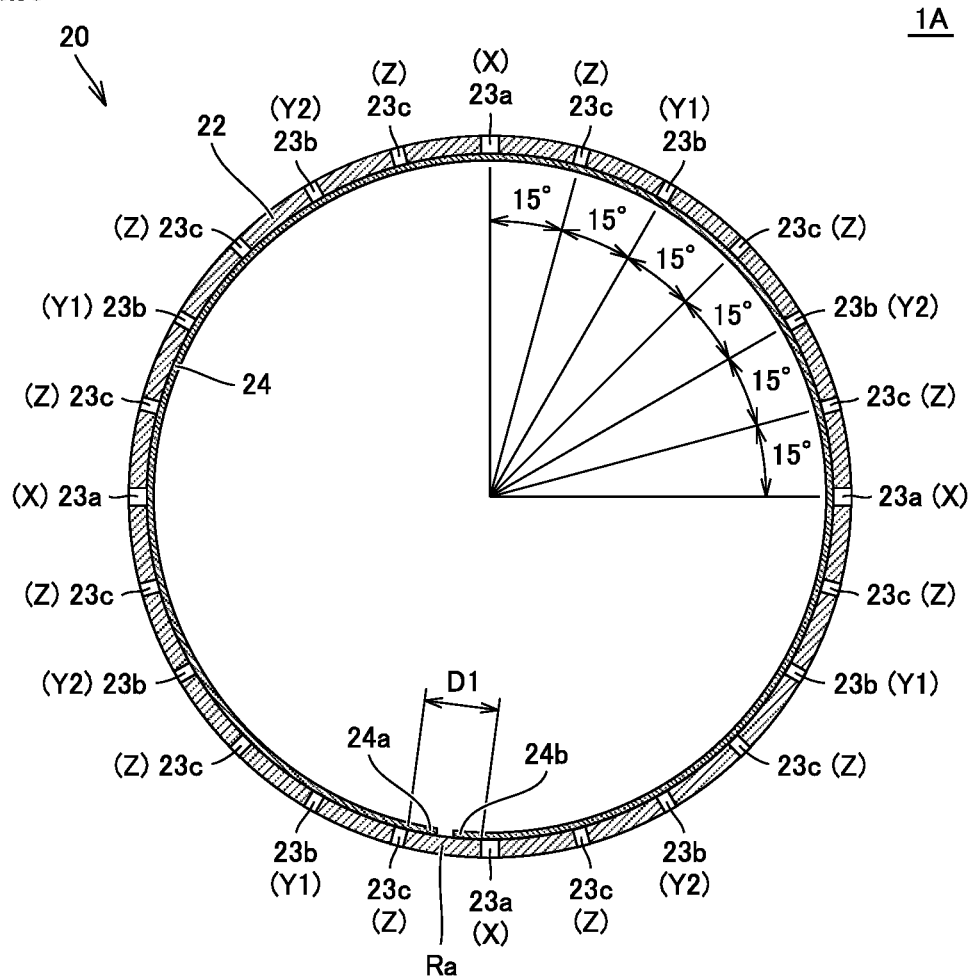
FIG. 3 is a cross-sectional view of an upper shell and a scaling tape along the line III-III shown in FIGS. 1 and 2.
Figure 4:
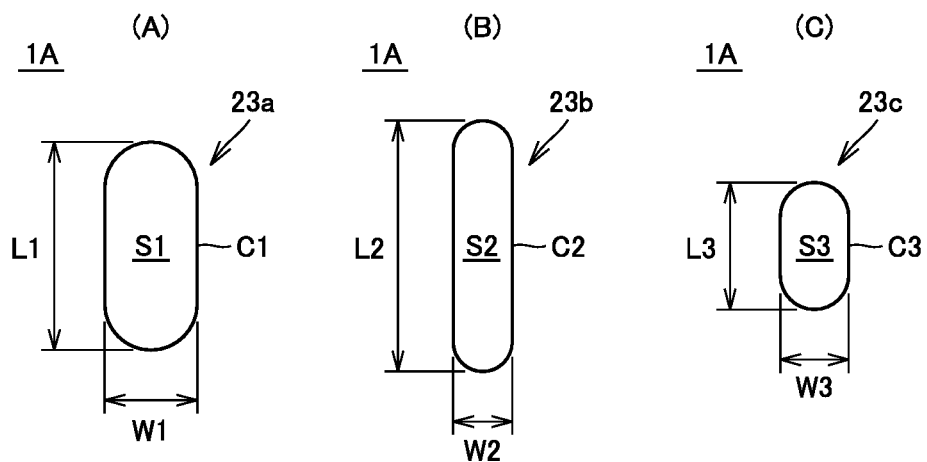
FIG. 4 is an enlarged view of first to third gas discharge openings shown in FIGS. 1 and 3.

FIG. 3 is a cross-sectional view of the upper shell and the sealing tape along the line III-III shown in FIGS. 1 and 2 and FIG. 4 is an enlarged view of the first to third gas discharge openings shown in FIGS. 1 and 3. A more detailed construction of first to third gas discharge openings 23a to 23c provided in circumferential wall portion 22 of upper shell 20 will be described below with reference to FIGS. 3 and 4 and FIG. 1 described previously.

As shown in FIGS. 1 and 3, in the present embodiment, first gas discharge opening 23a, second gas discharge opening 23b, and third gas discharge opening 23c described above are provided as being aligned under a prescribed rule along the circumferential direction of circumferential wall portion 22 of upper shell 20. More specifically, twenty-four gas discharge openings 23 in total are evenly arranged at a 15[°] interval along the circumferential direction of circumferential wall portion 22 of upper shell 20.

Four first gas discharge openings 23a are provided and arranged every 90[°] along the circumferential direction of circumferential wall portion 22 of upper shell 20. Eight second gas discharge openings 23b are provided and arranged at intervals of 30[°], 60[°], 30[°], 60[°] . . . along the circumferential direction of circumferential wall portion 22 of upper shell 20. Twelve third gas discharge openings 23c are provided and arranged every 30[°] along the circumferential direction of circumferential wall portion 22 of upper shell 20.

First gas discharge opening 23a, second gas discharge opening 23b, and third gas discharge opening 23c are arranged along the circumferential direction of circumferential wall portion 22 of upper shell 20 in the order of first gas discharge opening 23a, third gas discharge opening 23c, second gas discharge opening 23b, third gas discharge opening 23c, second gas discharge opening 23b, and third gas discharge opening 23c, with this set being defined as one set and with four sets as such being repeated. The plurality of gas discharge openings 23 are thus arranged so as not to overlap with each other in the circumferential direction of circumferential wall portion 22 of upper shell 20.

As shown in FIGS. 1 and 4 (A), first gas discharge opening 23a is in a shape of an elongated hole different in opening width in directions orthogonal to each other. More specifically, the first gas discharge opening is in such a shape of a vertically elongated hole that an opening width L1 along the axial direction of circumferential wall portion 22 of upper shell 20 (hereinafter opening width L1 along the axial direction of circumferential wall portion 22 being also referred to as a length L1) is greater than an opening width W1 along the circumferential direction of circumferential wall portion 22 (hereinafter opening width W1 along the circumferential direction of circumferential wall portion 22 being simply also referred to as a width W1). Strictly speaking, first gas discharge opening 23a is provided as a track-shaped hole having a pair of opening edge portions extending in parallel along the axial direction of circumferential wall portion 22.

As shown in FIGS. 1 and 4 (B), second gas discharge opening 23b is in a shape of an elongated hole different in opening width in directions orthogonal to each other. More specifically, the second gas discharge opening is in such a shape of a vertically elongated hole that an opening width L2 along the axial direction of circumferential wall portion 22 of upper shell 20 (hereinafter opening width L2 along the axial direction or circumferential wall portion 22 being also referred to as a length L2) is greater than an opening width W2 along the circumferential direction or circumferential wall portion 22 (hereinafter opening width W2 along the circumferential direction of circumferential wall portion 22 being simply also referred to as a width W2). Strictly speaking, second gas discharge opening 23b is provided as a track-shaped hole having a pair of opening edge portions extending in parallel along the axial direction of circumferential wall portion 22.

As shown in FIGS. 1 and 4 (C), third gas discharge opening 23c is in a shape of an elongated hole different in opening width in directions orthogonal to each other. More specifically, the third gas discharge opening is in such a shape of a vertically elongated hole that an opening width L3 along the axial direction of circumferential wall portion 22 of upper shell 20 (hereinafter opening width L3 along the axial direction of circumferential wall portion 22 being also referred to as a length L3) is greater than an opening width W3 along the circumferential direction of circumferential wall portion 22 (hereinafter opening width W3 along the circumferential direction of circumferential wall portion 22 being simply also referred to as a width W3). Strictly speaking, third gas discharge opening 23c is provided as a track-shaped hole having a pair of opening edge portions extending in parallel along the axial direction of circumferential wall portion 22.

First gas discharge opening 23a, second gas discharge opening 23b, and third gas discharge opening 23c are all in a shape of a vertically elongated hole and thus all gas discharge openings 23 are in the shape of the vertically elongated hole.

Referring to FIGS. 4 (A) to 4 (C), S1 to S3 satisfy a condition of S1>S2>S3 where S1 represents an opening area per one first gas discharge opening 23a (corresponding to a first opening area), S2 represents an opening area per one second gas discharge opening 23b (corresponding to a second opening area), and S3 represents an opening area per one third gas discharge opening 23c (corresponding to a third opening area). Namely, opening area S2 of second gas discharge opening 23b is smaller than opening area S1 of first gas discharge opening 23a, and opening area S3 of third gas discharge opening 23c is smaller than opening area S2 of second gas discharge opening 23b.

Referring to FIG. 3, sealing tape 24 is applied to the inner circumferential surface of upper shell 20 as described above and sealing tape 24 closes each of twenty-four gas discharge openings 23 in total. Sealing tape 24 is applied such that one end portion 24a and the other end portion 24b in the direction of extension thereof substantially abut on each other, and twenty-four gas discharge openings 23 in total are covered with one sealing tape 24.

An opening pressure of gas discharge opening 23 is expressed as F×t×C/S, where F represents shear strength (tensile strength) of sealing tape 24, t represents a thickness of a portion of sealing tape 24 which closes gas discharge opening 23, C represents a circumferential length of the gas discharge opening (circumferential lengths C1 to C3 shown in FIG. 4 which correspond to circumferential length C), and S represents an opening area of gas discharge opening 23 (opening areas S1 to S3 described above which correspond to opening area 5).

Therefore, by appropriately adjusting circumferential lengths C1 to C3 and opening areas S1 to S3 described above, an opening pressure of first gas discharge opening 23a is set to be lowest, an opening pressure of second gas discharge opening 23b is set to be second lowest, and an opening pressure of third gas discharge opening 23c is set to be highest in the present embodiment.

In setting the opening pressure, as is understood from the expression above, the opening pressure can be higher by setting a longer circumferential length C while opening area S remains the same. In other words, by constructing the plurality of gas discharge openings 23 to be in a shape of a vertically elongated hole as in the present embodiment, various opening pressures can be set while an interval between adjacent gas discharge openings 23 is sufficiently ensured in order to suppress lowering in pressure-resistant performance of the housing. A degree of freedom in design is significantly improved and disc-type gas generator 1A can consequently be reduced in size as compared with an example in which opening pressures of the plurality of gas discharge openings are set in several levels while a total opening area of the plurality of gas discharge openings is increased simply by increasing a size of some of the plurality of gas discharge openings with a geometrically similar shape of a precise circle being maintained.

When a filter obtained by winding and sintering a metal wire rod of stainless steel or iron steel or a filter formed by press-working a mesh material into which metal wire rods are knitted to thereby pack the same is employed as filter 90, such a phenomenon that a pressure of the gas discharged through gas discharge openings 23 at the time of activation deforms filter 90 in portions facing gas discharge openings 23, the deformed portion is crushed outward, and consequently the filter sticks out of gas discharge openings 23 may occur.

This phenomenon is likely when gas discharge opening 23 has a shape of a precise circle and less likely when gas discharge opening 23 does not have the shape of the precise circle. The reason is estimated as follows. When gas discharge opening 23 has a shape ala non-precise circle, a flow resistance of gas discharge opening 23 in such a shape against the gas in a corner portion or a nook portion of gas discharge opening 23 increases, a flow rate of the gas which actually passes is suppressed as a whole with respect to an opening area of gas discharge opening 23, and force pushing filter 90 outward described above is weakened.

Based on this point of view, gas discharge opening 23 preferably has a shape of a non-precise circle as represented by a shape of a vertically elongated hole described above, and in particular, a gas discharge opening of which opening area is increased for setting a lower opening pressure more preferably has a shape of a non-precise circle. The shape of the non-precise circle as referred to here includes various shapes, and examples thereof include a shape of a laterally elongated hole and a shape of an obliquely elongated hole in addition to the shape of the vertically elongated hole described above, and further include a cross shape, a V shape, a T shape, and a shape resulting from rotation of the firmer around the center.

When the shape is quantitatively expressed, at least any of the plurality of first gas discharge openings 23a, the plurality of second gas discharge openings 23b, and the plurality of third gas discharge openings 23c is in such a shape that S and C satisfy a condition preferably of $S/C \leq 0.27 \times S^{0.5}$ and more preferably of $S/C \leq 0.22 \times S^{0.5}$ where S [mm$^2$] represents an opening area of one gas discharge opening and C [mm] represents a circumferential length of the one gas discharge opening.

Figure 5:
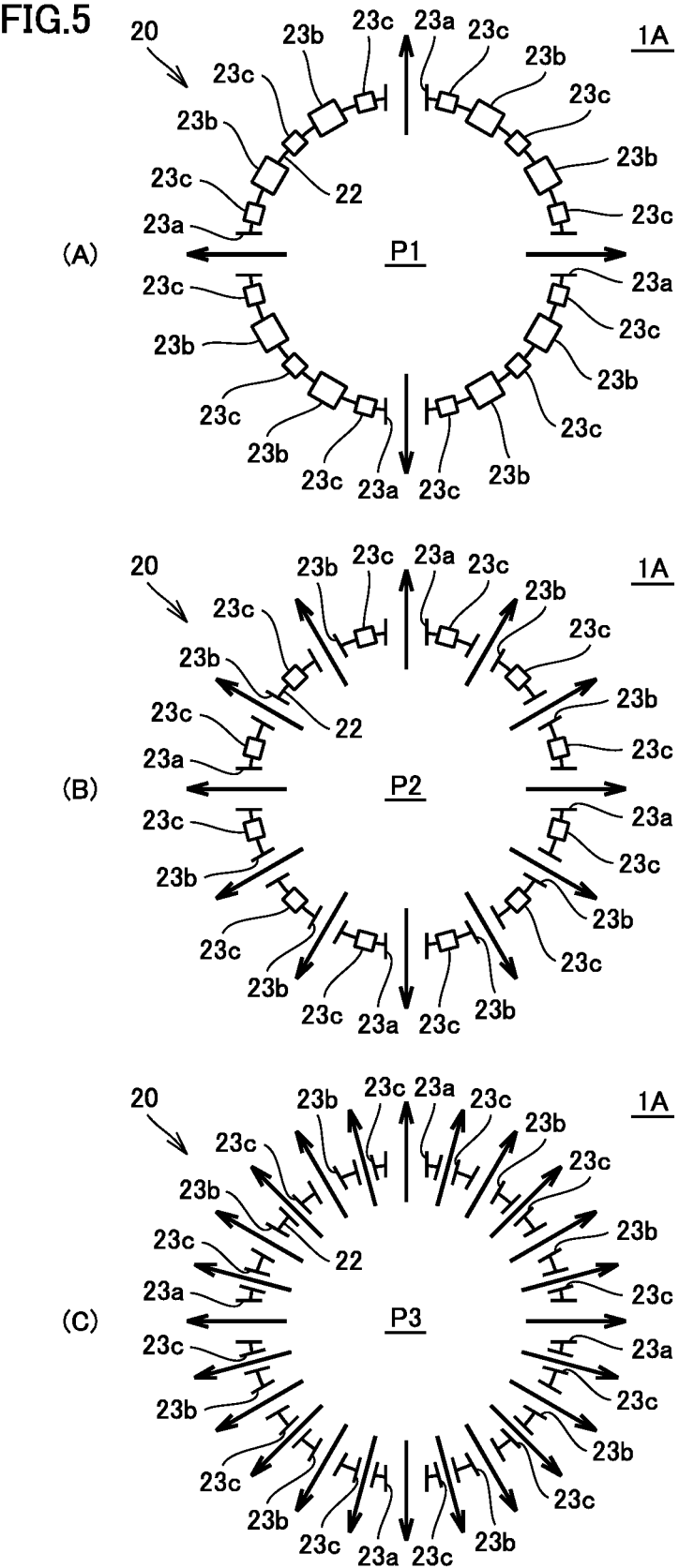
FIG. 5 schematically shows stepwise opening of the gas discharge openings at the time of activation of the gas generator in the embodiment of the present invention.

FIG. 5 schematically shows stepwise opening of the gas discharge openings at the time of activation of the gas generator in the present embodiment. A reason why significant drop in increase in internal pressure at the time of activation can be prevented in particular in a low-temperature environment in disc-type gas generator 1A in the present embodiment will be described below with reference to FIG. 5. FIGS. 5 (A), 5 (B), and 5 (C) each schematically show a stale at the time point of lapse of a prescribed period of time since start of activation, and the elapsed time is longer in the order of FIGS. 5 (A), 5 (B), and 5 (C).

When disc-type gas generator 1A in the present embodiment is activated, gas generating agent 61 starts to burn and an internal pressure in combustion chamber 60 accordingly starts to increase. In disc-type gas generator 1A in the present embodiment, in a process of increase in internal pressure in combustion chamber 60, the plurality of gas discharge openings 23 open stepwise.

In a first stage after start of activation, the internal pressure in combustion chamber 60 has not reached a pressure at which all of first gas discharge opening 23a, second gas discharge opening 23b, and third gas discharge opening 23c can open. Therefore, first gas discharge opening 23a, second gas discharge opening 23b, and third gas discharge opening 23c do not open and the internal pressure continues to increase.

In a second stage after start of activation, the internal pressure in combustion chamber 60 reaches an internal pressure P1 at which four first gas discharge openings 23a lowest in opening pressure among first gas discharge openings 23a, second gas discharge openings 23b, and third gas discharge openings 23c can open, and portions of sealing tape 24 covering four first gas discharge openings 23a are accordingly cleaved as shown in FIG. 5 (A) so that gas is discharged through four open first gas discharge openings 23a. Thus, gas output is obtained in a relatively short period of time since start of activation and expansion and development of the air bag can be started in an early stage.

In the second stage after start of activation, second gas discharge openings 23b and third gas discharge openings 23c have not yet been opened. Therefore, an internal pressure in combustion chamber 60 is maintained in an appropriate high-pressure state and the internal pressure in combustion chamber 60 does not extremely drop. Therefore, stable combustion of gas generating agent 61 continues and expansion and development of the air bag can be maintained.

In a third stage alter start of activation, the internal pressure in combustion chamber 60 reaches an internal pressure P2 at which eight second gas discharge openings 23b lowest in opening pressure next to first gas discharge openings 23a among first gas discharge openings 23a, second gas discharge openings 23b, and third gas discharge openings 23c can open, and portions of sealing tape 24 covering eight second gas discharge openings 23b are accordingly cleaved as shown in FIG. 5 (B) so that gas is discharged through open first gas discharge openings 23a and second gas discharge openings 23b twelve in total, inclusive of four first gas discharge openings 23a which have already been open.

In the third stage after start of activation, third gas discharge openings 23c have not yet been opened. Therefore, the internal pressure in combustion chamber 60 is maintained in an appropriate high-pressure state and the internal pressure in combustion chamber 60 does not extremely drop. Therefore, stable combustion of gas generating agent 61 continues and expansion and development of the air bag can be maintained.

In a fourth stage after start of activation, the internal pressure in combustion chamber 60 reaches an internal pressure P3 at which twelve third gas discharge openings 23c highest in opening pressure among first gas discharge openings 23a, second gas discharge openings 23b, and third gas discharge openings 23c can open, and portions of sealing tape 24 covering twelve third gas discharge openings 23c are accordingly cleaved as shown in FIG. 5 (C) so that gas is discharged through all open first gas discharge openings 23a, second gas discharge openings 23b, and third gas discharge openings 23c twenty-four in total, inclusive of first gas discharge openings 23a and second gas discharge openings 23b twelve in total which have already been open.

At this time point, the internal pressure in combustion chamber 60 has already reached a sufficiently high pressure state. Therefore, gas generating agent 61 continues combustion in a stable manner and gas output high in a stable manner is obtained until gas generating agent 61 burns out. Sustained development of the air bag can further continue.

In a fifth stage after start of activation, output of the gas is stopped with gas generating agent 61 having burnt out, and thus activation of disc-type gas generator 1A ends and development of the air bag also ends.

Thus, disc-type gas generator 1A in the present embodiment is constructed such that, at the time of activation of disc-type gas generator 1A, the plurality of gas discharge openings 23 open stepwise with increase in pressure in the accommodation space described above which is the space inside the housing with combustion of gas generating agent 61. Therefore, significant drop in increase in internal pressure can be prevented in particular in the low-temperature environment as compared with the disc-type gas generator constructed such that all gas discharge openings open in unison with increase in pressure in the space inside the housing. Therefore, sustained combustion of gas generating agent 61 can be achieved in any temperature environment from the high-temperature environment to the low-temperature environment, and consequently difference in gas output performance attributed to an environmental temperature can be lessened.

In order to reliably obtain an effect of lessening of difference in gas output performance attributed to the environmental temperature by setting the plurality of gas discharge openings 23 to open in three stages, SA1 to SA3 preferably satisfy a condition of SA1<SA2+SA3 where SA1 represents the sum of opening areas of the plurality of first gas discharge openings 23a, SA2 represents the sum of opening areas of the plurality of second gas discharge openings 23b, and SA3 represents the sum of opening areas of the plurality of third gas discharge openings 23c (in the present embodiment, SA1=4×S1, SA2=8×S2, and SA3=12×S3). Sum SA1 of the opening areas of the plurality of first gas discharge openings 23a is preferably smaller than the total sum of sum SA2 of the opening areas of the plurality of second gas discharge openings 23b and sum SA3 of the opening areas of the plurality of third gas discharge openings 23c. This is because, when the sum (SA1) of the opening areas of the plurality of first gas discharge openings 23a occupied in the total sum (that is, SA1+SA2+SA3) of the opening areas of the plurality of gas discharge openings 23 is large, it is difficult to maintain the internal pressure in combustion chamber 60 to the high-pressure state.

Referring to FIG. 3, in disc-type gas generator 1A in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 23 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 23a in total arranged at a 90[°] interval Second gas discharge opening group Y1: four gas discharge openings 23b in total arranged at a 90[°] interval Second gas discharge opening group Y2: four gas discharge openings 23b in total arranged at a 90[°] interval Third gas discharge opening group Z: twelve gas discharge openings 23c in total arranged at a 30[°] interval In disc-type gas generator 1A in the present embodiment, the plurality of gas discharge openings 23 consist of four groups X, Y1, Y2, and Z in total of gas discharge openings each group including only a plurality of gas discharge openings set to be opened at an identical opening pressure and evenly arranged along the circumferential direction of circumferential wall portion 22 in rotation symmetry at an angle not greater than 120[°] around the axial line of circumferential wall portion 22 of upper shell 20.

According to such a construction, even though fixing force of the fixing member (for example, a retainer of the air bag apparatus) which fixes disc-type gas generator 1A is insufficient only at some positions in the circumferential direction of the housing (for example, lowering in fixing force due to aging), thrusts applied to disc-type gas generator 1A can be prevented from being significantly unbalanced.

More specifically, in the second stage after start of activation described above, four first gas discharge openings 23a evenly arranged along the circumferential direction of circumferential wall portion 22 of upper shell 20 are opened so that the gas is discharged at four positions equidistant in the circumferential direction of circumferential wall portion 22. Even though fixing force of the fixing member which fixes disc-type gas generator 1A is insufficient only at some positions in the circumferential direction of the housing, thrusts applied to disc-type gas generator 1A are relatively less likely to be unbalanced.

In the third stage after start of activation described above, first gas discharge openings 23a and second gas discharge openings 23b twelve in total evenly arranged along the circumferential direction of circumferential wall portion 22 of upper shell 20 are opened. Therefore, the gas is discharged at twelve positions equidistant along the circumferential direction of circumferential wall portion 22. Even though fixing force of the fixing member which fixes disc-type gas generator 1A is insufficient only at some positions in the circumferential direction of the housing, thrusts applied to disc-type gas generator 1A are considerably less likely to be unbalanced.

Therefore, by adopting the construction, a disc-type gas generator higher in safety than the conventional disc-type gas generator in particular in an early stage after start of activation can be obtained.

Additionally, in the second and third stages after start of activation described above, the air bag has not yet sufficiently been developed and opened gas discharge openings 23 and the air bag are very close to each other. In that case as well, the gas is discharged as being distributed at four positions and twelve positions equidistant along the circumferential direction of circumferential wall portion 22 of upper shell 20. Therefore, impingement of the gas at a high temperature and a high pressure to a local portion of the air bag in a concentrated manner can be avoided. Therefore, by adopting the construction, the possibility of damage to the air bag can also be lowered.

This is attributed to even arrangement of remaining all gas discharge openings (that is, all of first gas discharge openings 23a and second gas discharge openings 23b) except for gas discharge openings 23c included in third gas discharge opening group 7 among the plurality of gas discharge openings 23 along the circumferential direction of circumferential wall portion 22 of upper shell 20. In disc-type gas generator 1A in the present embodiment, all of the plurality of gas discharge openings 23 (that is, third gas discharge openings 23c in addition to first gas discharge openings 23a and second gas discharge openings 23b, altogether) are evenly arranged along the circumferential direction of circumferential wall portion 22 of upper shell 20. Therefore, in the fourth stage after start of activation described above as well, the gas is also discharged as being distributed at twenty-four positions equidistant along the circumferential direction of circumferential wall portion 22 of upper shell 20.

By adopting the construction, the number of gas discharge openings 23 can be increased while opening areas of the plurality of individual gas discharge openings 23 provided in the housing are suppressed as compared with the conventional disc-type gas generator. Therefore, a pressure in the space inside the housing at the time of activation can be lowered to a considerable extent within a range in which sustained combustion of gas generating agent 61 can be achieved in a stable manner. Therefore, the housing can be decreased in thickness while pressure-resistant performance of the housing is ensured, and consequently significant reduction in size and weight of the disc-type gas generator can be realized.

As described above, with disc-type gas generator 1A in the present embodiment, a disc-type gas generator capable of achieving reduction in size and weight, lessening a difference in gas output performance attributed to an environmental temperature, and improving safety at the time of activation and lessening damage to an air bag can be obtained.

Disc-type gas generator 1A in the present embodiment is of such a type as expanding and developing an air bag of a standard size. Circumferential wall portion 22 of upper shell 20 is designed to have an outer diameter, for example, of 60.4 [mm] and a thickness (a plate thickness), for example, of 1.1 [mm].

In this case, length L1 and width W1 of first gas discharge opening 23a are set, for example, to 4.6 [mm] and 1.8 [mm], respectively, length L2 and width W2 of second gas discharge opening 23b are set, for example, to 5.2 [mm] and 1.2 [mm], respectively, and length L3 and width W3 of third gas discharge opening 23c are set, for example, to 2.7 [mm] and 1.3 [mm], respectively.

The plurality of gas discharge openings 23 are provided generally by punching with a pressing machine. In the design as above, however, a pitch between adjacent gas discharge openings 23 is as small as approximately 7.6 [mm]. Therefore, it is virtually impossible to provide the gas discharge openings by performing punching once due to restriction of the pressing machine.

From a point of view of reduction in manufacturing cost, however, all of the plurality of gas discharge openings 23 are preferably provided by performing punching as small a number of times as possible. Therefore, in manufacturing disc-type gas generator 1A constructed above, in a process for providing the plurality of gas discharge openings 23, preferably, twelve gas discharge openings in total included in one first gas discharge opening group X described above and two second gas discharge opening groups Y1 and Y2 described above are provided by performing punching once and twelve gas discharge openings in total included in one third gas discharge opening group Z described above are provided by performing punching once. Thus, all of the plurality of gas discharge openings 23 can be provided by performing punching twice so that manufacturing cost can be reduced.

In this case, wall regions Ra each located between adjacent gas discharge openings 23 in circumferential wall portion 22 are substantially equal in width along the circumferential direction of circumferential wall portion 22, and a linear dimension between end portions of adjacent gas discharge openings 23 (a linear dimension shown with a reference D1 in FIG. 3) is approximately 6.0 [mm].

When distance D1 is shorter than 7.0 [mm], it is difficult to arrange one end portion 24a and the other end portion 24b in the direction of extension of sealing tape 24 as abutting on each other on the inner circumferential surface of one specific wall region of the plurality of wall regions Ra in attaching sealing tape 24. If positions of attachment of opposing end portions or sealing tape 24 are displaced from wall region Ra, such a problem as lowering in sealability will arise. In that case, a redoing operation is required and productivity significantly lowers.

Therefore, any of widths of wall regions Ra is preferably designed to 7.0 [mm] or greater. A specific method of avoiding impairment of various effects described above while a shape and a size of first gas discharge openings 23a, second gas discharge openings 23b, and third gas discharge openings 23c described above are maintained will be described in a second embodiment later.

By shaping gas discharge opening 23 into an elongated hole as in the present embodiment described above, an actual opening area with gas discharge openings 23 being open can differ depending on a difference in environmental temperature (that is, in a low-temperature environment, a room-temperature environment, or a high-temperature environment), and burning of the gas generating agent can be promoted in particular in the low-temperature environment. Therefore, a difference in gas output performance due to an environmental temperature can remarkably be lessened and a disc-type gas generator higher in performance than in the conventional example can be obtained. This aspect will be described below in detail.

Figure 6:
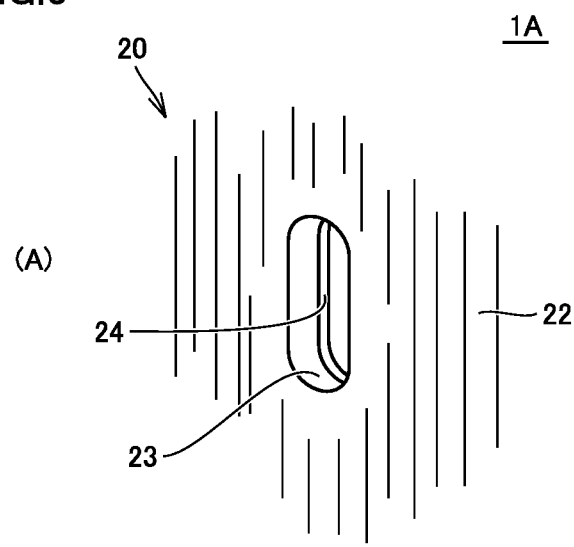
FIG. 6 schematically shows a state in the vicinity of a gas discharge opening when the gas generator in the embodiment of the present invention is activated.
Figure 6:
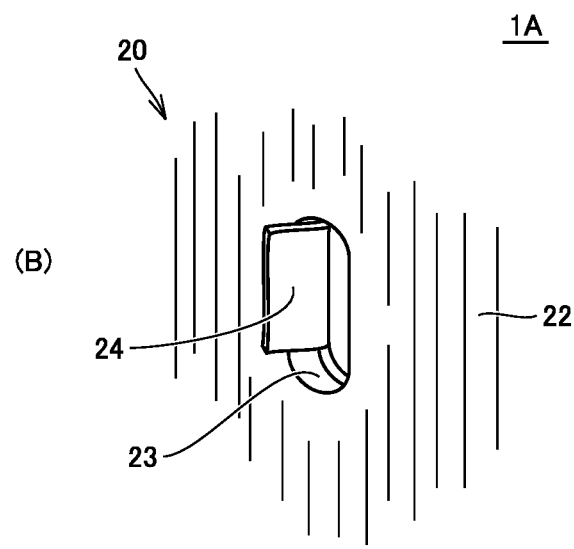

FIG. 6 is a diagram schematically showing a state in the vicinity of a gas discharge opening when the gas generator in the present embodiment is activated. FIG. 6 (A) shows an example in which the gas generator is activated in the room-temperature environment and in the high-temperature environment and FIG. 6 (B) shows an example in which the gas generator is activated in the low-temperature environment.

As shown in FIG. 6 (A), when disc-type gas generator 1A in the present embodiment is activated in the room-temperature environment and in the high-temperature environment, sealing tape 24 is completely broken along the opening edge portion of gas discharge opening 23 in a shape of an elongated hole in cleavage of sealing tape 24 in the portion closing gas discharge opening 23 with increase in internal pressure in combustion chamber 60, and broken sealing tape 24 does not adhere to the opening edge portion of gas discharge opening 23. Therefore, an opening area of gas discharge opening 23 and an actual opening area with gas discharge opening 23 being open as a result of cleavage of scaling tape 24 are equal to each other.

As shown in FIG. 6 (B), when disc-type gas generator 1A in the present embodiment is activated in the low-temperature environment, sealing tape 24 is broken along the opening edge portion of gas discharge opening 23 in a shape of an elongated hole in cleavage of scaling tape 24 in the portion closing gas discharge opening 23 with increase in internal pressure in combustion chamber 60, however, it is not completely broken along the entire periphery of the opening edge portion. The scaling tape is not broken along one of the pair of opening edge portions which extend in parallel along circumferential wall portion 22 and broken sealing tape 24 adheres to the opening edge portion of gas discharge opening 23. Therefore, an actual opening area with gas discharge opening 23 being open as a result of cleavage of sealing tape 24 is smaller than an opening area of gas discharge opening 23 by an amount corresponding to a cross-sectional area of sealing tape 24.

Therefore, the relatively large total sum of actual opening areas of gas discharge openings 23 at the time of activation of disc-type gas generator 1A is ensured in the room-temperature environment and in the high-temperature environment, whereas the total sum of actual opening areas of gas discharge openings 23 at the time of activation of disc-type gas generator 1A is relatively decreased in the low-temperature environment. Thus, an amount of the gas emitted through gas discharge openings 23 as a result of opening of gas discharge openings 23 in the low-temperature environment is restricted as compared with the amount in the room-temperature environment and in the high-temperature environment, and increase in internal pressure in combustion chamber 60 is accordingly promoted. Therefore, burning of gas generating agent 61 can be promoted in particular in the low-temperature environment, so that a difference in gas output performance due to the environmental temperature can remarkably be lessened, and consequently, a disc-type gas generator higher in performance than in the conventional example can be obtained.

The reason why a difference as to whether or not a part of cleaved sealing tape 24 adheres to the opening edge portion of gas discharge opening 23 in accordance with an ambient temperature is caused by adopting the feature as in the present embodiment is exclusively estimated as follows. Since gas discharge opening 23 is in a shape of an elongated hole which is not an annular hole, a distance from the center of gas discharge opening 23 to the opening edge portion is not uniform. Then, instantaneous energy required to break sealing tape 24 at once along the opening edge portion increases. A rate of increase in internal pressure in combustion chamber 60 in the room-temperature environment and in the high-temperature environment is high, and hence instantaneous energy is obtained. On the other hand, a rate of increase in internal pressure in combustion chamber 60 is low in the low-temperature environment, and hence instantaneous energy is not obtained.

Though an example in which gas discharge opening 23 is provided as a track-shaped hole has been described by way of a typical example of the shape of the elongated hole in the present embodiment, the shape of gas discharge opening 23 is not limited thereto, but may be oval or rectangular. In order to more reliably obtain the effect described above, gas discharge opening 23 in the shape of the elongated hole preferably has a pair of opening edge portions which extend in parallel along circumferential wall portion 22 and it is further preferably provided as a hole in a track shape or a rectangular shape described above.

Though an example in which all of the plurality of gas discharge openings 23 are constructed into a shape of a vertically elongated hole has been described by way of example in the present embodiment, a considerable effect can be obtained also when only some of the plurality of gas discharge openings 23 are constructed into a shape of a vertically elongated hole, and an effect substantially the same as the effect described above can be obtained also when all or some of the plurality of gas discharge openings 23 are constructed into a shape of a laterally elongated hole. The shape of a laterally elongated hole refers to such a shape of an elongated hole that an opening width along the circumferential direction of circumferential wall portion 22 of upper shell 20 is greater than an opening width along the axial direction or circumferential wall portion 22.

Though an example in which the plurality of gas discharge openings 23 are arranged as being aligned along the circumferential direction of circumferential wall portion 22 of upper shell 20 has been described by way of example in the present embodiment, the gas discharge openings may be arranged as being staggered or in a plurality of rows or in another layout.

Though an example in which all gas discharge openings 23 are closed by a single sealing tape 24 in a form of a band has been described by way of example in the present embodiment, for example, a plurality of sealing tapes may be used in such a manner as closing some of the plurality of gas discharge openings 23 with a single sealing tape and closing others of the plurality of gas discharge openings 23 with another sealing tape.

Second Embodiment

Figure 7:
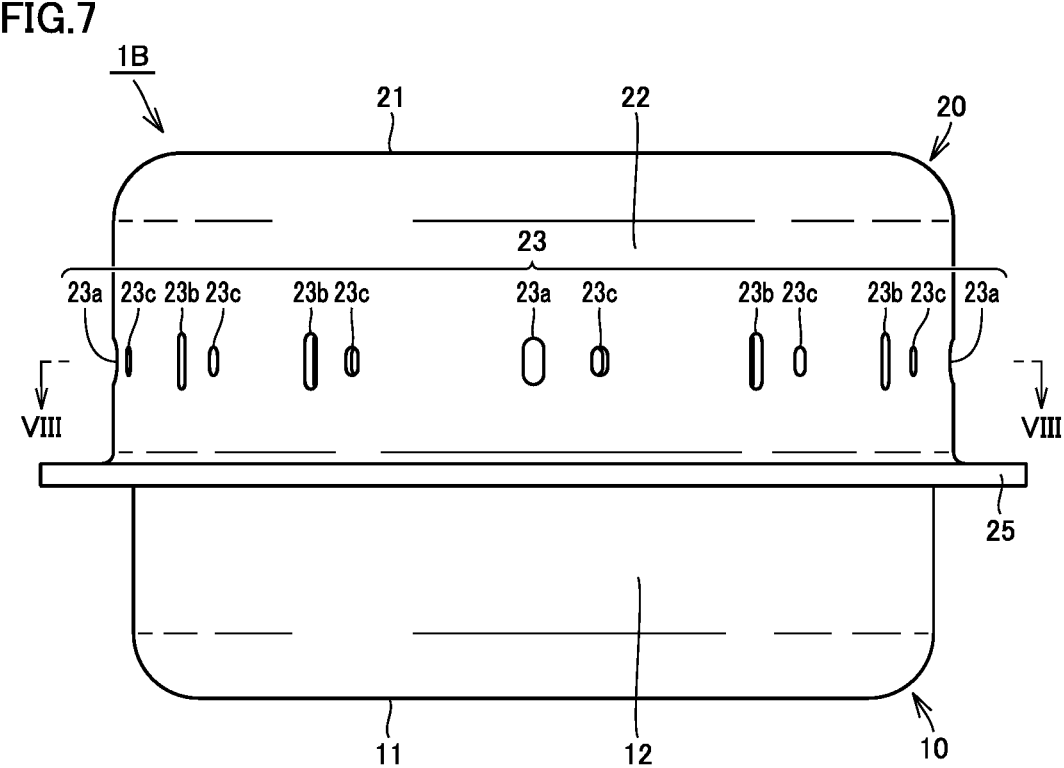
FIG. 7 is a front view of a disc-type gas generator in a second embodiment of the present invention.
Figure 8:
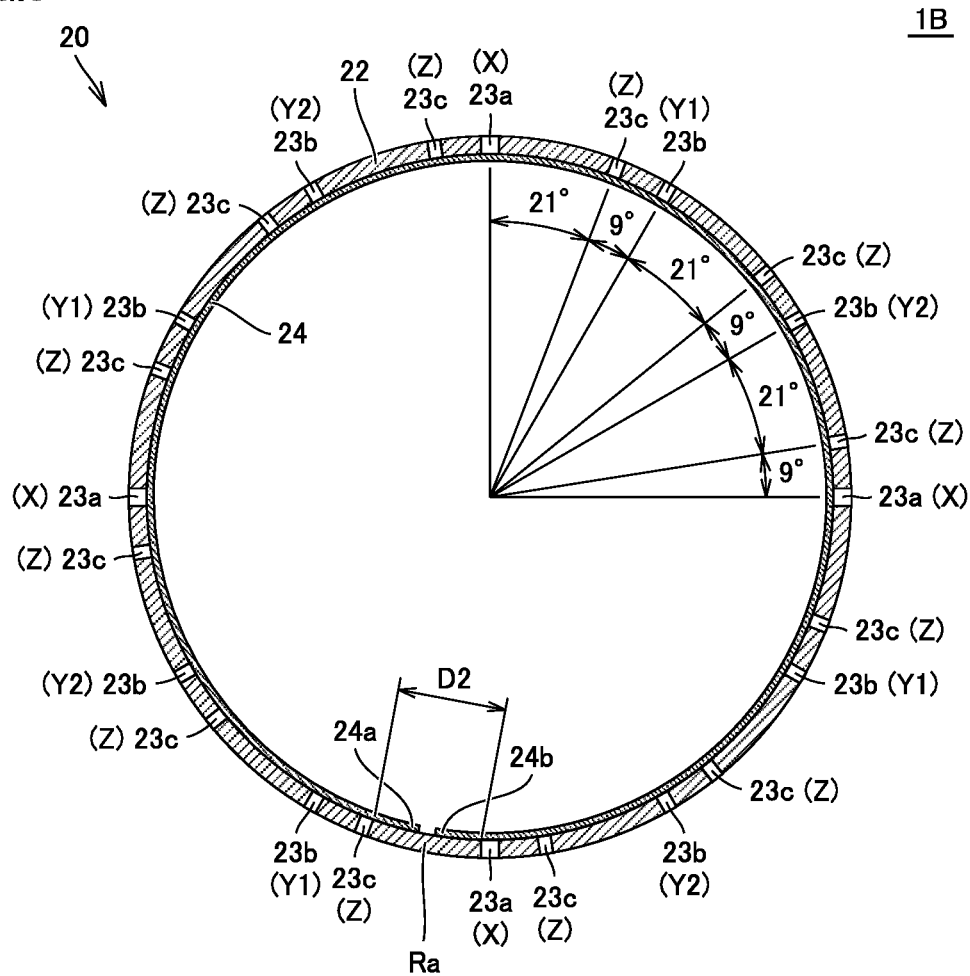
FIG. 8 is a cross-sectional view of the upper shell and the scaling tape along the line VIII-VIII shown in FIG. 7.

FIG. 7 is a front view of a disc-type gas generator in a second embodiment of the present invention and FIG. 8 is a cross-sectional view of the upper shell and the sealing tape along the line VIII-VIII shown in FIG. 7. A disc-type gas generator 1B in the second embodiment of the present invention will be described below with reference to FIGS. 7 and 8.

Disc-type gas generator 1B in the present embodiment is of a type of expanding and developing an air bag of the standard size similarly to disc-type gas generator 1A in the first embodiment described above, and first gas discharge openings 23a, second gas discharge openings 23b, and third gas discharge openings 23c (sec FIG. 4) similar in shape and size to those in disc-type gas generator 1A in the first embodiment described above are provided in circumferential wall portion 22 of upper shell 20 as shown in FIGS. 7 and 8.

In the present embodiment, first gas discharge opening 23a, second gas discharge opening 23b, and third gas discharge opening 23c are provided as being aligned under a prescribed rule along the circumferential direction of circumferential wall portion 22 of upper shell 20 (a rule different from the rule shown in the first embodiment described above). More specifically, twenty-four gas discharge openings 23 in total are arranged every prescribed angle along the circumferential direction of circumferential wall portion 22 of upper shell 20.

Four first gas discharge openings 23a are provided and arranged every 90[°] along the circumferential direction of circumferential wall portion 22 of upper shell 20. Eight second gas discharge openings 23b are provided and arranged at intervals of 30 [°], 60 [°], 30 [°], 60[°], . . . along the circumferential direction of circumferential wall portion 22 of upper shell 20. Twelve third gas discharge openings 23c are provided and arranged every 30[°] along the circumferential direction of circumferential wall portion 22 of upper shell 20.

First gas discharge opening 23a, second gas discharge opening 23b, and third gas discharge opening 23c are arranged along the circumferential direction of circumferential wall portion 22 of upper shell 20 in the order of first gas discharge opening 23a, third gas discharge opening 23c, second gas discharge opening 23b, third gas discharge opening 23c, second gas discharge opening 23b, and third gas discharge opening 23c, with this set being defined as one set and with four sets as such being repeated. The plurality of gas discharge openings 23 are thus arranged so as not to overlap with each other in the circumferential direction of circumferential wall portion 22 of upper shell 20.

Intervals of arrangement among gas discharge openings 23 arranged in the order of first gas discharge opening 23a, third gas discharge opening 23c, second gas discharge opening 23b, third gas discharge opening 23c, second gas discharge opening 23b, third gas discharge opening 23c, first gas discharge opening 23a, . . . described above are set sequentially to 21[°], 9[°], 21[°], 9[°], 21[°], 9[°], . . . as illustrated.

Referring to FIG. 8, in disc-type gas generator 1B in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 23 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 23a in total arranged at a 90[°] interval Second gas discharge opening group Y1: four gas discharge openings 23b in total arranged at a 90[°] interval Second gas discharge opening group Y2: four gas discharge openings 23b in total arranged at a 90[°] interval Third gas discharge opening group Z: twelve gas discharge openings 23c in total arranged at a 30[°] interval In disc-type gas generator 1B in the present embodiment as well, as in the first embodiment described above, the plurality of gas discharge openings 23 consist of four groups X, Y1, Y2, and Z in total of gas discharge openings each group including only a plurality of gas discharge openings set to be opened at an identical opening pressure and evenly arranged along the circumferential direction of circumferential wall portion 22 in rotation symmetry at an angle not greater than 120[°] around the axial line of circumferential wall portion 22 of upper shell 20.

Therefore, with disc-type gas generator 1B in the present embodiment, a disc-type gas generator higher in safety than the conventional disc-type gas generator in particular at an early stage after start of activation can be obtained. Therefore, by adopting the construction, a disc-type gas generator capable of achieving reduction in size and weight, lessening a difference in gas output performance attributed to an environmental temperature, and improving safety at the time of activation and lessening damage to an air bag can be obtained.

In disc-type gas generator 1B in the present embodiment as well, remaining all gas discharge openings (that is, all of first gas discharge openings 23a and second gas discharge openings 23b) except for gas discharge openings 23c included in third gas discharge opening group Z among the plurality of gas discharge openings 23 are evenly arranged along the circumferential direction of circumferential wall portion 22 of upper shell 20. Therefore, in the second and third stages after start of activation described above, the gas is discharged as being distributed at four positions and twelve positions equidistant along the circumferential direction of circumferential wall portion 22 of upper shell 20. Therefore, by adopting the construction, the possibility of damage to the air bag can be lowered.

Disc-type gas generator 1B in the present embodiment is of such a type as expanding and developing an air bag of the standard size as described above. Circumferential wall portion 22 of upper shell 20 is designed to have an outer diameter, for example, of 60.4 [mm] and a thickness (a plate thickness), for example, of 1.1 [mm].

In this case, length L1 and width W1 of first gas discharge opening 23a are set, for example, to 4.6 [mm] and 1.8 [mm], respectively, length L2 and width W2 of second gas discharge opening 23b are set, for example, to 5.2 [mm] and 1.2 [mm], respectively, and length L3 and width W3 of third gas discharge opening 23c are set, for example, to 2.7 [mm] and 1.3 [mm], respectively.

In this case, wall regions Ra each located between adjacent gas discharge openings 23 in circumferential wall portion 22 are various in width along the circumferential direction of circumferential wall portion 22, and a linear dimension between end portions of a pair of gas discharge openings 23a adjacent to wall region Ra greatest in width (a linear dimension shown with a reference D2 in FIG. 8) is approximately 9.1 [mm].

Unlike disc-type gas generator 1A in the first embodiment described above, in disc-type gas generator 1B in the present embodiment, gas discharge openings 23 are thus not completely evenly arranged along the circumferential direction of circumferential wall portion 22 of upper shell 20. A plurality of wall regions Ra of which linear dimension D2 is not smaller than 7.0 [mm] for providing a margin for attachment of opposing end portions of sealing tape 24 are provided so that an operation for attaching sealing tape 24 is facilitated.

Therefore, by adopting the construction, an operation for attaching sealing tape 24 can be facilitated without impairing various effects described in the first embodiment described above while a shape and a size of first gas discharge opening 23a, second gas discharge opening 23b, and third gas discharge opening 23c shown in the first embodiment described above are maintained.

When the construction is adopted as well, twelve gas discharge openings in total included in one first gas discharge opening group X and two second gas discharge opening groups Y1 and Y2 are provided by performing punching once and twelve gas discharge openings in total included in one third gas discharge opening group Z are provided by performing punching once so that all of the plurality of gas discharge openings 23 can be provided by performing punching twice in total and manufacturing cost also in consideration of restrictions imposed by a pressing machine can be minimized.

Third Embodiment

Figure 9:
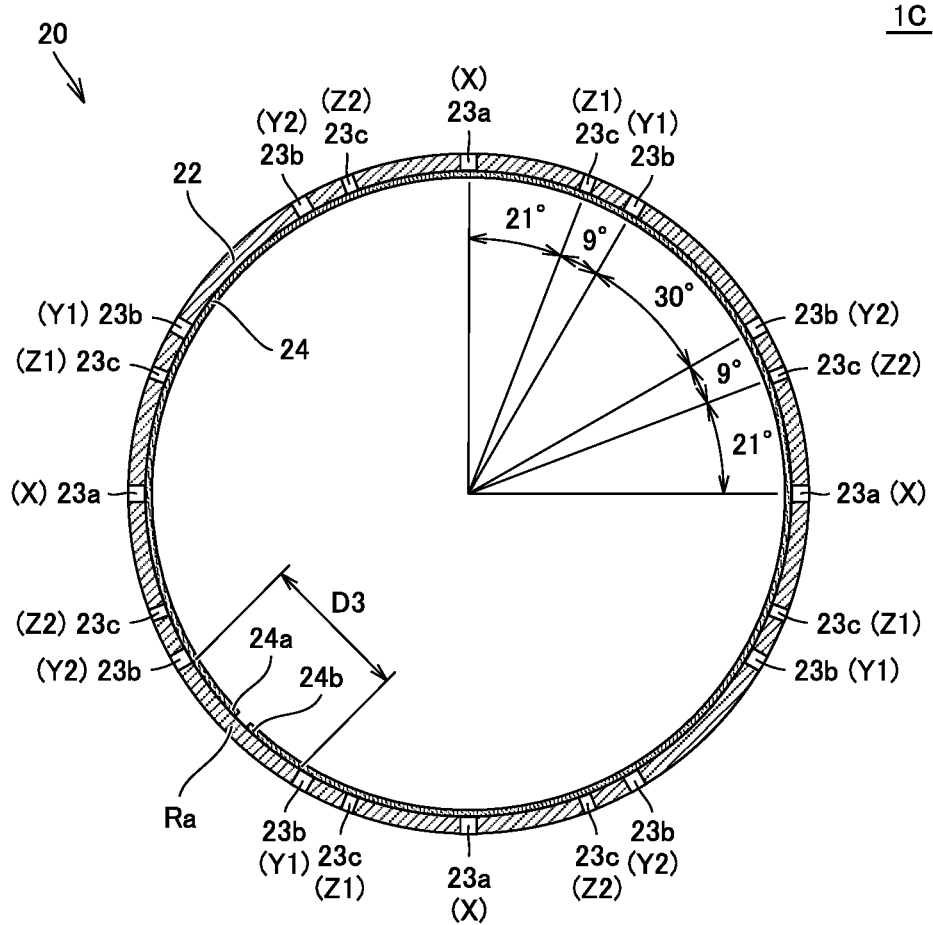
FIG. 9 is a cross-sectional view of the upper shell and the sealing tape in a disc-type gas generator in a third embodiment of the present invention.
Figure 10:
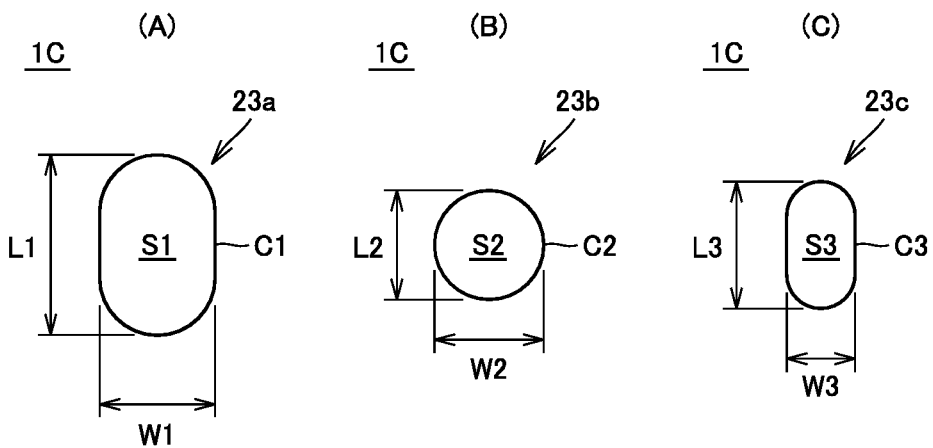
FIG. 10 is an enlarged view of first to third gas discharge openings shown in FIG. 9.

FIG. 9 is a cross-sectional view of the upper shell and the sealing tape in a disc-type gas generator in a third embodiment of the present invention and FIG. 10 is an enlarged view of the first to third gas discharge openings shown in FIG. 9. A disc-type gas generator 1C in the third embodiment of the present invention will be described below with reference to FIGS. 9 and 10.

Unlike disc-type gas generator 1B in the second embodiment described above, disc-type gas generator 1C in the present embodiment is of a type of expanding and developing a small-sized air bag smaller than the standard size. As shown in FIG. 9, gas discharge openings 23 smaller in number than in disc-type gas generator 1B in the second embodiment described above are provided in circumferential wall portion 22 of upper shell 20.

Specifically, as shown in FIG. 9, first gas discharge opening 23a, second gas discharge opening 23b, and third gas discharge opening 23c are provided as being aligned under a prescribed rule along the circumferential direction of circumferential wall portion 22 of upper shell 20 (a rule different from the rule shown in the second embodiment described above). More specifically, twenty gas discharge openings 23 in total are arranged every prescribed angle along the circumferential direction of circumferential wall portion 22 of upper shell 20.

Four first gas discharge openings 23a are provided and arranged every 90[°] along the circumferential direction of circumferential wall portion 22 of upper shell 20. Eight second gas discharge openings 23b are provided and arranged at intervals of 30[°], 60[°], 30[°], 60[°], . . . along the circumferential direction of circumferential wall portion 22 of upper shell 20. Eight third gas discharge openings 23c are provided and arranged at intervals of 48[°], 42[°], 48[°], 42[°], . . . along the circumferential direction of circumferential wall portion 22 of upper shell 20.

First gas discharge opening 23a, second gas discharge opening 23b, and third gas discharge opening 23e are arranged along the circumferential direction of circumferential wall portion 22 of upper shell 20 in the order of first gas discharge opening 23a, third gas discharge opening 23c, second gas discharge opening 23b, second gas discharge opening 23b, and third gas discharge opening 23c, with this set being defined as one set and with four sets as such being repeated. The plurality of gas discharge openings 23 are thus arranged so as not to overlap with each other in the circumferential direction of circumferential wall portion 22 of upper shell 20.

Intervals of arrangement among gas discharge openings 23 arranged in the order of first gas discharge opening. 23a, third gas discharge opening 23c, second gas discharge opening 231), second gas discharge opening 23b, third gas discharge opening 23c, first gas discharge opening 23a, . . . described above are set sequentially to 21[°], 9[°], 30[°], 9[°], 21[°], . . . as illustrated.

Referring to FIG. 9, in disc-type gas generator 1C in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 23 described above can be regarded as consisting of a plurality of groups of gas discharge openings below. The gas discharge openings are grouped such that one group of gas discharge openings consists of gas discharge openings as many as possible as described above.

First gas discharge opening group X: four gas discharge openings 23a in total arranged at a 90[°] interval Second gas discharge opening group Y1: four gas discharge openings 23b in total arranged at a 90[°] interval Second gas discharge opening group Y2: four gas discharge openings 23b in total arranged at a 90[°] interval Third gas discharge opening group Z1: four gas discharge openings 23c in total arranged at a 90[°] interval Third gas discharge opening group Z2: four gas discharge openings 23c in total arranged at a 90[°] interval In disc-type gas generator 1C in the present embodiment, the plurality of gas discharge openings 23 consist of five groups X, Y1, Y2, Z1, and Z2 in total of gas discharge openings each group including only a plurality of gas discharge openings set to be opened at an identical opening pressure and evenly arranged along the circumferential direction of circumferential wall portion 22 in rotation symmetry at an angle not greater than 120[°] around the axial line of circumferential wall portion 22 of upper shell 20.

Therefore, with disc-type gas generator 1C in the present embodiment, a disc-type gas generator higher in safety than the conventional disc-type gas generator in particular at an early stage after start of activation can be obtained. Therefore, by adopting the construction, a disc-type gas generator capable of achieving reduction in size and weight, lessening a difference in gas output performance attributed to an environmental temperature, and improving safety at the time of activation and lessening damage to an air bag can be obtained.

In disc-type gas generator 1C in the present embodiment as well, remaining all gas discharge openings (that is, all of first gas discharge openings 23a and second gas discharge openings 23b) except for gas discharge openings 23c included in third gas discharge opening group Z1, Z2 among the plurality of gas discharge openings 23 are evenly arranged along the circumferential direction of circumferential wall portion 22 of upper shell 20. Therefore, in the second and third stages after start of activation described above, the gas is discharged as being distributed at four positions and twelve positions equidistant along the circumferential direction of circumferential wall portion 22 of upper shell 20. Therefore, by adopting the construction, the possibility of damage to the air bag can be lowered.

Disc-type gas generator 1C in the present embodiment is of such a type as expanding and developing a small-sized air bag smaller than the standard size as described above. Circumferential wall portion 22 of upper shell 20 is designed to have an outer diameter, for example, of 57.5 [mm] and a thickness (a plate thickness), for example, or 1.1 [mm].

In this case, referring to FIG. 10, length L1 and width W1 of first gas discharge opening 23a are set, for example, to 3.7 [mm] and 2.1 [mm], respectively, length L2 and width W2 of second gas discharge opening 23b are set, for example, to 2.0 [mm] (that is, set in a shape of a precise circle in a plan view), and length L3 and width W3 of third gas discharge opening 23c are set, for example, to 2.7 [mm] and 1.3 [mm], respectively.

In this case, wall regions Ra each located between adjacent gas discharge openings 23 in circumferential wall portion 22 are various in width along the circumferential direction of circumferential wall portion 22, and a linear dimension between end portions of a pair of gas discharge openings 23 adjacent to wall region Ra greatest in width (a linear dimension shown with a reference D3 in FIG. 9) is approximately 12.4 [mm].

In disc-type gas generator 1C in the present embodiment, as in disc-type gas generator 1B in the second embodiment described above, gas discharge openings 23 are thus not completely evenly arranged along the circumferential direction of circumferential wall portion 22 of upper shell 20. A plurality of wall regions Ra of which linear dimension D3 is not smaller than 7.0 [mm] for providing a margin for attachment of opposing end portions of sealing tape 24 are provided so that an operation for attaching sealing tape 24 is facilitated.

By adopting the construction as well, twelve gas discharge openings in total included in one first gas discharge opening group X and two second gas discharge opening groups Y1 and Y2 are provided by performing punching once and eight gas discharge openings in total included in two third gas discharge opening groups Z1 and Z2 are provided by performing punching once so that all of the plurality of gas discharge openings 23 can be provided by performing punching twice in total and manufacturing cost also in consideration of restrictions imposed by a pressing machine can be minimized.

Fourth Embodiment

Figure 11:
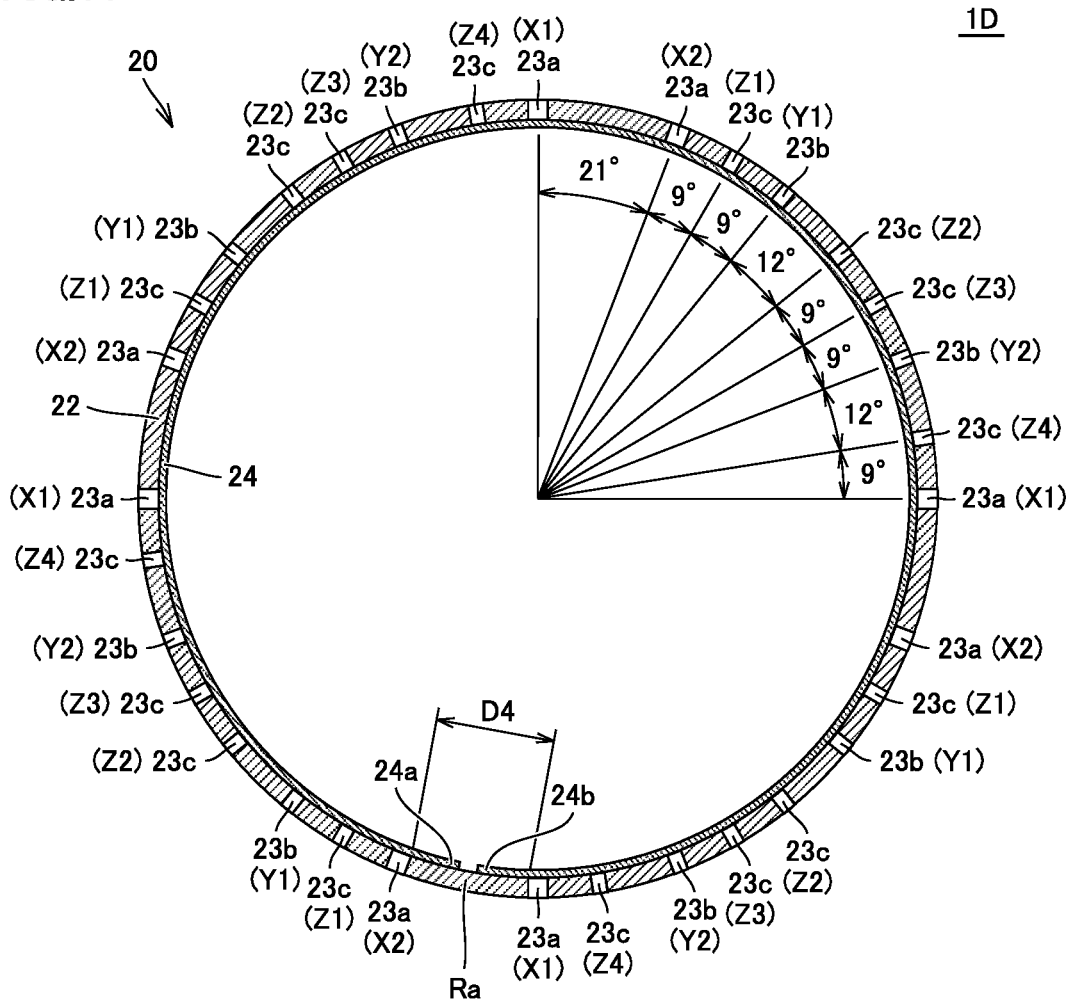
FIG. 11 is a cross-sectional view of the upper shell and the scaling tape in a disc-type gas generator in a fourth embodiment of the present invention.
Figure 12:
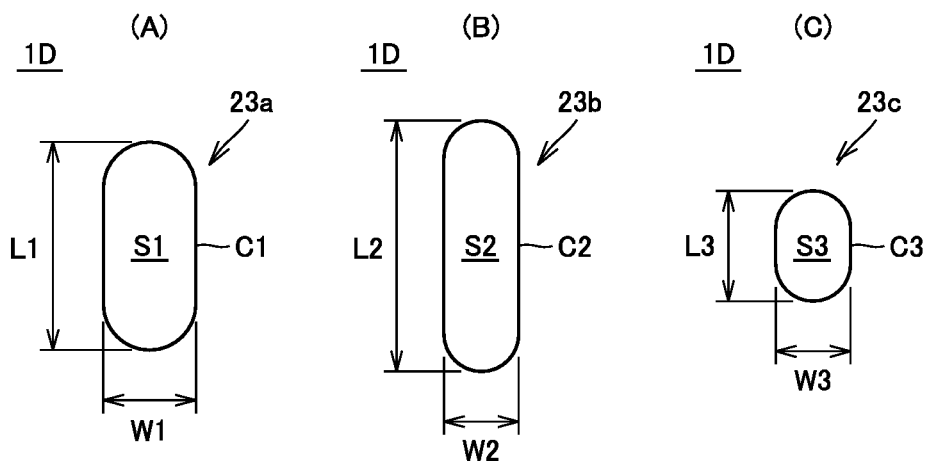
FIG. 12 is an enlarged view of the first to third gas discharge openings shown in FIG. 11.

FIG. 11 is a cross-sectional view of the upper shell and the sealing tape in a disc-type gas generator in a fourth embodiment of the present invention and FIG. 12 is an enlarged view of the first to third gas discharge openings shown in FIG. 11. A disc-type gas generator 1D in the fourth embodiment of the present invention will be described below with reference to FIGS. 11 and 12.

Unlike disc-type gas generator 1B in the second embodiment described above, disc-type gas generator 1D in the present embodiment is of a type of expanding and developing a large-sized air bag larger than the standard size. As shown in FIG. 11, gas discharge openings 23 greater in number than in disc-type gas generator 1B in the second embodiment described above are provided in circumferential wall portion 22 of upper shell 20.

Specifically, as shown in FIG. 11, first gas discharge opening 23a, second gas discharge opening 23b, and third gas discharge opening 23c are provided as being aligned under a prescribed rule along the circumferential direction of circumferential wall portion 22 of upper shell 20 (a rule different from the rule shown in the second embodiment described above). More specifically, thirty-two gas discharge openings 23 in total are arranged every prescribed angle along the circumferential direction of circumferential wall portion 22 of upper shell 20.

Eight first gas discharge openings 23a are provided and arranged at intervals of 21 [°], 69 [°], 21 [°], 69[°], . . . along the circumferential direction of circumferential wall portion 22 of upper shell 20. Eight second gas discharge openings 23b are provided and arranged at intervals of 30[°], 60[°], 30[°], 60[°], . . . along the circumferential direction of circumferential wall portion 22 of upper shell 20. Sixteen third gas discharge openings 23c are provided and arranged at intervals of 21[°], 9[°], 21[°], 39[°], 21[°], 9[°], 21[°], 39[°], . . . along the circumferential direction of circumferential wall portion 22 of upper shell 20.

First gas discharge opening 23a, second gas discharge opening 23b, and third gas discharge opening 23c are arranged along the circumferential direction of circumferential wall portion 22 of upper shell 20 in the order of first gas discharge opening 23a, first gas discharge opening 23a, third gas discharge opening 23c, second gas discharge opening 23b, third gas discharge opening 23e; third gas discharge opening 23c, second gas discharge opening 23b, and third gas discharge opening 23c, with this set being defined as one set and with four sets as such being repeated. The plurality of gas discharge openings 23 are thus arranged so as not to overlap with each other in the circumferential direction of circumferential wall portion 22 of upper shell 20.

Intervals of arrangement among gas discharge openings 23 arranged in the order of first gas discharge opening 23a, first gas discharge opening 23a, third gas discharge opening 23c, second gas discharge opening 23b, third gas discharge opening 23c, third gas discharge opening 23c, second gas discharge opening 23b, third gas discharge opening 23c, first gas discharge opening 23a, . . . described above are set sequentially to 21[°], 9[°], 9[°], 12[°], 9[°], 9[°], 12[°], 9[°], . . . as illustrated.

Referring to FIG. 11, in disc-type gas generator 1D in the present embodiment, with attention being paid to gas discharge openings constructed to be identical in shape and opening area so as to be identical in opening pressure and being regarded as a group of gas discharge openings in accordance with positions where they are provided, the plurality of gas discharge openings 23 described above can be regarded as consisting of a plurality of groups of gas discharge openings below. The gas discharge openings are grouped such that one group of gas discharge openings consists of gas discharge openings as many as possible as described above.

First gas discharge opening group X1: four gas discharge openings 23a in total arranged at a 90[°] interval First gas discharge opening group X2: four gas discharge openings 23a in total arranged at a 90[°] interval Second gas discharge opening group Y1: four gas discharge openings 23b in total arranged at a 90[°] interval Second gas discharge opening group Y2: four gas discharge openings 23b in total arranged at a 90[°] interval Third gas discharge opening group Z1: four gas discharge openings 23c in total arranged at a 90[°] interval Third gas discharge opening group Z2: four gas discharge openings 23c in total arranged at a 90[°] interval Third gas discharge opening group Z3: four gas discharge openings 23c in total arranged at a 90[°] interval Third gas discharge opening group Z4: four gas discharge openings 23c in total arranged at a 90[°] interval In disc-type gas generator 1D in the present embodiment, the plurality of gas discharge openings 23 consist of eight groups X1, X2, Y1, Y2, Z1, Z2, Z3, and Z4 in total of gas discharge openings each group including only a plurality of gas discharge openings set to be opened at an identical opening pressure and evenly arranged along the circumferential direction of circumferential wall portion 22 in rotation symmetry at an angle not greater than 120[°] around the axial line of circumferential wall portion 22 of upper shell 20.

Therefore, with disc-type gas generator 1D in the present embodiment, a disc-type gas generator higher in safety than the conventional disc-type gas generator in particular at an early stage after start of activation can be obtained. Therefore, by adopting the construction, a disc-type gas generator capable of achieving reduction in size and weight, lessening a difference in gas output performance attributed to an environmental temperature, and improving safety at the time of activation and lessening damage to an air bag can be obtained.

Disc-type gas generator 1D in the present embodiment is of such a type as expanding and developing a large-sized air bag larger than the standard size as described above. Circumferential wall portion 22 of upper shell 20 is designed to have an outer diameter, for example, of 70.0 [mm] and a thickness (a plate thickness), for example, of 1.3 [mm].

In this case, referring to FIG. 11, length L1 and width W1 of first gas discharge opening 23a are set, for example, to 4.4 [mm] and 1.8 [mm], respectively, length L2 and width W2 of second gas discharge opening 23b are set, for example, to 5.2 [mm] and 1.4 [mm], respectively, and length L3 and width W3 of third gas discharge opening 23c are set, for example, to 2.5 [mm] and 1.4 [mm], respectively.

In this case, wall regions Ra each located between adjacent gas discharge openings 23 in circumferential wall portion 22 are various in width along the circumferential direction of circumferential wall portion 22, and a linear dimension between end portions of a pair of gas discharge openings 23 adjacent to wall region Ra greatest in width (a linear dimension shown with a reference D4 in FIG. 11) is approximately 10.5 [mm].

In disc-type gas generator 1D in the present embodiment, as in disc-type gas generator 1B in the second embodiment described above, gas discharge openings 23 are thus not completely evenly arranged along the circumferential direction of circumferential wall portion 22 of upper shell 20. A plurality of wall regions Ra of which linear dimension D4 is not smaller than 7.0 [mm] for providing a margin for attachment of opposing end portions of sealing tape 24 are provided so that an operation for attaching sealing tape 24 is facilitated.

By adopting the construction as well, twelve gas discharge openings in total included in one first gas discharge opening group X1 and two third gas discharge opening groups Z1 and Z3 are provided by performing punching once, twelve gas discharge openings in total included in one first gas discharge opening group X2 and two third gas discharge opening groups Z2 and Z4 are provided by performing punching once, and eight gas discharge openings in total included in two second gas discharge opening groups Y1 and Y2 are provided by performing punching once so that all of the plurality of gas discharge openings 23 can be provided by performing punching three times in total and manufacturing cost also in consideration of restrictions imposed by a pressing machine can be minimized.

(Other Forms in Conformity with First to Fourth Embodiments)

Though an example in which the minimum number of gas discharge openings included in one group of gas discharge openings is set to four (that is, the minimum number of gas discharge openings identical in opening pressure evenly arranged along the circumferential direction in the circumferential wall portion of the housing is set to four) has been described by way of example in the first to fourth embodiments of the present invention above, the minimum number of gas discharge openings included in one group of gas discharge openings can be set to three.

By setting the minimum number of gas discharge openings included in one group of gas discharge openings to three or more, even though fixing force of the fixing member which fixes a disc-type gas generator is insufficient only at some positions in the circumferential direction of the housing, thrusts applied to the disc-type gas generator can be prevented from being significantly unbalanced as compared with the conventional disc-type gas generator, and consequently, a disc-type gas generator higher in safety in particular at an early stage after start of activation can be obtained.

Therefore, so long as the minimum number of gas discharge openings for each type to be included in one group of gas discharge openings (that is, the number of first gas discharge openings, the number of second gas discharge openings, and the number of third gas discharge openings) disclosed in the first to fourth embodiments of the present invention described above is three or more (that is, a plurality of gas discharge openings included in one group of gas discharge openings satisfy a condition of rotation symmetry at an angle not greater than 120[°], the number may be set to any number.

Similarly, a shape, a size, or a layout of gas discharge openings for each type disclosed in the first to fourth embodiments of the present invention described above can variously be modified without departing from the gist of the present invention.

Though an example in which a plurality of first gas discharge openings included in one group or two or more groups of first gas discharge openings, a plurality of second gas discharge openings included in one group or two or more groups of second gas discharge openings, and a plurality of third gas discharge openings included in one group or two or more groups of third gas discharge openings are identical in shape and opening area so as to be identical in opening pressure for each type has been described by way of example in the first to fourth embodiments of the present invention above, an opening pressure of the gas discharge opening is determined mainly by an opening area and a circumferential length thereof as described previously.

Therefore, a method of providing a plurality of gas discharge openings identical in opening pressure is not limited to an approach to provide a plurality of gas discharge openings identical in shape and opening area as described above. Even though gas discharge openings are different in shape and opening area from one another, they can be identical in opening pressure by adjusting as appropriate an opening area or a circumferential length thereof.

For example, by adjusting a circumferential length as appropriate, a gas discharge opening greater in opening area can be higher in opening pressure than a gas discharge opening smaller in opening area. On the contrary, for example, by adjusting an opening area as appropriate, a gas discharge opening smaller in circumferential length can be higher in opening pressure than a gas discharge opening greater in circumferential length. Therefore, in order to set an opening pressure different for each type of a gas discharge opening, an opening area or a circumferential length is desirably adjusted as appropriate.

Thus, gas discharge openings arranged in rotation symmetry at 120[°] or smaller along the circumferential direction in the circumferential wall portion of the housing are desirably constructed to be identical in opening pressure to one another and a shape or an opening area of an individual gas discharge opening is not particularly restricted. Additionally, since an opening pressure of the gas discharge opening can be adjusted as appropriate also by changing shear strength or a thickness of a sealing member which closes the gas discharge opening, the shear strength or the thickness may individually be adjusted for each gas discharge opening.

For example, a method of setting opening areas of gas discharge openings different from one another basically with attention being paid only thereto and a method of setting circumferential lengths of gas discharge openings different from one another basically with attention being paid only thereto are assumed as a relatively easy design approach to construct a plurality of gas discharge openings provided in the housing such that they are opened stepwise in three stages.

A disc-type gas generator in accordance with the former method includes a plurality of gas discharge openings provided in the circumferential wall portion of the housing, the plurality of gas discharge openings consisting of a plurality of groups of gas discharge openings, the plurality of groups of gas discharge openings including only one group or two or more groups of first gas discharge openings consisting of a plurality of first gas discharge openings identical in first opening area evenly arranged along the circumferential direction of the circumferential wall portion in rotation symmetry at an angle not greater than 120[°] around the axial line of the circumferential wall portion, one group or two or more groups of second gas discharge openings consisting of a plurality of second gas discharge openings identical in second opening area evenly arranged along the circumferential direction of the circumferential wall portion in rotation symmetry at an angle not greater than 120[°] ground the axial line of the circumferential wall portion, and one group or two or more groups of third gas discharge openings consisting of a plurality of third gas discharge openings identical in third opening area evenly arranged along the circumferential direction of the circumferential wall portion in rotation symmetry at an angle not greater than 120[°] around the axial line of the circumferential wall portion, the second opening area being smaller than the first opening area, the third opening area being smaller than the second opening area, and the plurality of gas discharge openings being arranged so as not to overlap with each other in the circumferential direction of the circumferential wall portion.

A disc-type gas generator in accordance with the latter method includes a plurality of gas discharge openings provided in the circumferential wall portion of the housing, the plurality of gas discharge openings consisting of a plurality of groups of gas discharge openings, the plurality of groups of gas discharge openings including only one group or two or more groups of first gas discharge openings consisting of a plurality of first gas discharge openings identical in first circumferential length evenly arranged along the circumferential direction of the circumferential wall portion in rotation symmetry at an angle not greater than 120[°] around the axial line of the circumferential wall portion, one group or two or more groups of second gas discharge openings consisting of a plurality of second gas discharge openings identical in second circumferential length evenly arranged along the circumferential direction of the circumferential wall portion in rotation symmetry at an angle not greater than 120[°] around the axial line of the circumferential wall portion, and one group or two or more groups of third gas discharge openings consisting of a plurality of third gas discharge openings identical in third circumferential length evenly arranged along the circumferential direction of the circumferential wall portion in rotation symmetry at an angle not greater than 120[°] around the axial line of the circumferential wall portion, the second circumferential length being greater than the first circumferential length, the third circumferential length being greater than the second circumferential length, and the plurality of gas discharge openings being arranged so as not to overlap with each other in the circumferential direction of the circumferential wall portion.

Additionally, though an example in which the present invention is applied to what is called a disc-type gas generator has been described by way of example in the first to fourth embodiments of the present invention above, applications of the present invention are not limited thereto and the present invention can also be applied, for example, to a cylinder-type gas generator.

The low-temperature environment, the room-temperature environment, and the high-temperature environment described above refer to an environment at a temperature around −40[°], an environment at a temperature around 20[°], and an environment at a temperature around 85[°], respectively.

Fifth Embodiment

Figure 13:
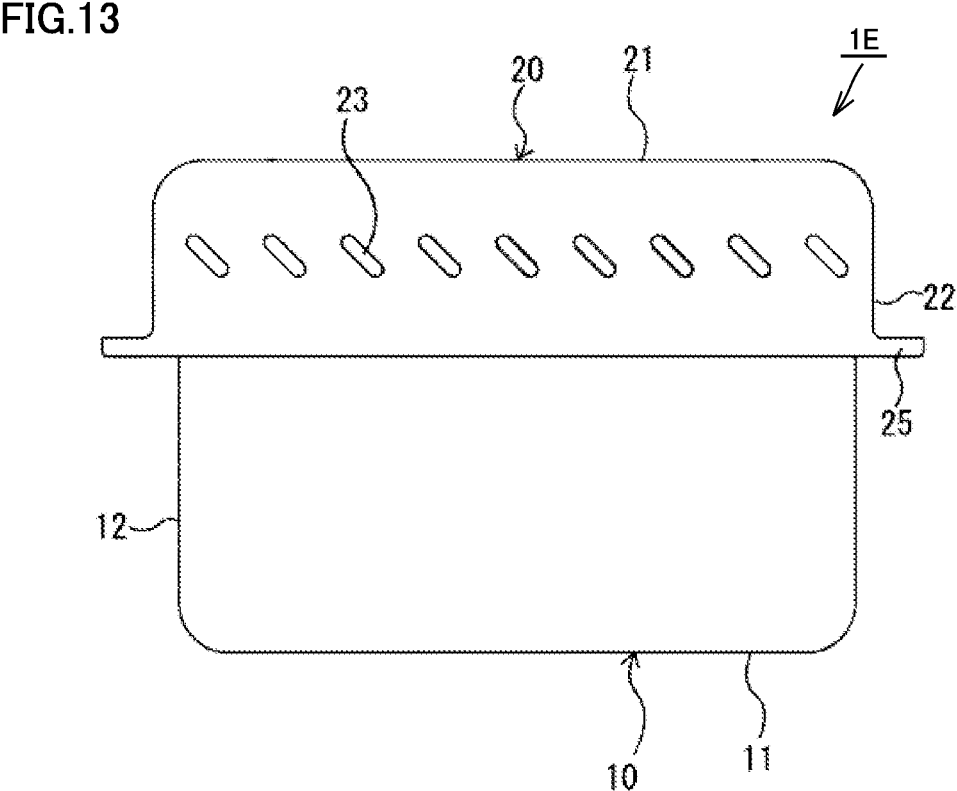
FIG. 13 shows an appearance of a disc-type gas generator in a fifth embodiment of the present invention.
Figure 14:
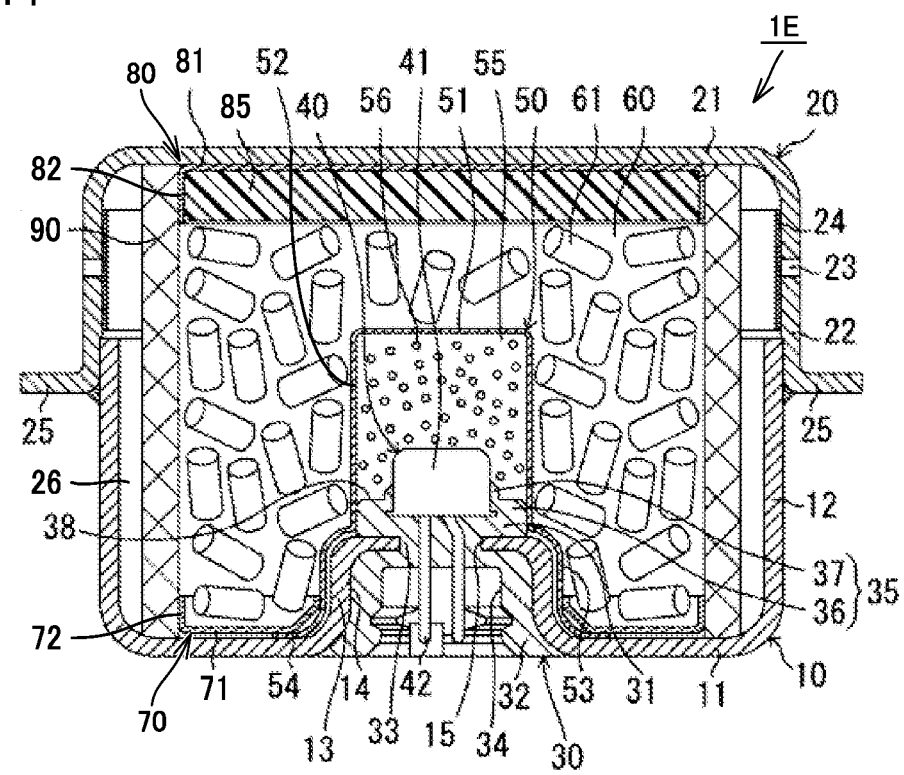

FIG. 13 shows an appearance of a disc-type gas generator in a fifth embodiment of the present invention and FIG. 14 is a schematic construction diagram of the disc-type gas generator shown in FIG. 13, of which part is seen through. A disc-type gas generator 1E in the present embodiment will initially be described with reference to FIGS. 13 and 14.

As shown in FIGS. 13 and 14, disc-type gas generator 1E in the present embodiment is slightly different in detailed construction from disc-type gas generator 1A in the first embodiment described above, however, it is basically similar in construction. A great difference resides in an opening shape of each or the plurality of gas discharge openings 23 provided in upper shell 20.

Specifically, as shown in FIG. 13, each of the plurality of gas discharge openings 23 is provided as a hole in an elongated shape identical in opening shape, and individual gas discharge opening 23 is provided as being inclined to intersect with the axial direction of the housing.

One gas discharge opening 23 is provided in such an opening shape that a condition of $S/C \leq 0.27 \times S^{0.5}$ (preferably, a condition of $S/C \leq 0.22 \times S^{0.5}$) is satisfied where $S$ [mm$^2$] represents an opening area of one of gas discharge openings 23 and $C$ [mm] represents a circumferential length of that one gas discharge opening 23. Such a condition is derived from results of a second verification test which will be described later. According to such a construction, even when an opening area per one gas discharge opening 23 is the same as in the conventional example, breakage of filter 90 at the time of activation can be suppressed.

$S_{ALL}$ and T satisfy relation of $70 < S_{ALL} \times T < 300$, preferably relation of $70 < S_{ALL} \times T < 250$, and more preferably relation of $70 < S_{ALL} \times T < 120$, where $S_{ALL}$ [mm$^2$] represents a total opening area of the plurality of gas discharge openings 23 and T [mm] represents a thickness of the housing (that is, a thickness of circumferential wall portion 22 of upper shell 20) (T≤2 [mm]). According to such a construction, breakage of filter 90 can be suppressed and disc-type gas generator 1E can be reduced in size and weight while a pressure in combustion chamber 60 at the time of activation is appropriately kept.

More specifically, when total opening area $S_{ALL}$ of the plurality of gas discharge openings 23 is excessively large, an internal pressure in combustion chamber 60 at the time of activation is not sufficiently raised and breakage of filter 90 is likely. When total opening area $S_{ALL}$ of the plurality of gas discharge openings 23 is excessively small, an internal pressure in combustion chamber 60 at the time of activation is higher than necessary. When thickness T of the housing is increased, reduction in size and weight is not achieved, although pressure-resistant performance of the housing is improved. When thickness T of the housing is made smaller, pressure-resistant performance of the housing is lower, although reduction in size and weight can be realized. Thus, total opening area $S_{ALL}$ of the plurality of gas discharge openings 23 and thickness T of the housing are important factors which correlate to each other in determining performance of disc-type gas generator 1E. By constructing the disc-type gas generator so as to satisfy the condition above, breakage of filter 90 can be suppressed and disc-type gas generator 1E as a whole can be reduced in size and weight while a pressure in combustion chamber 60 at the time of activation is appropriately kept.

Figure 15:
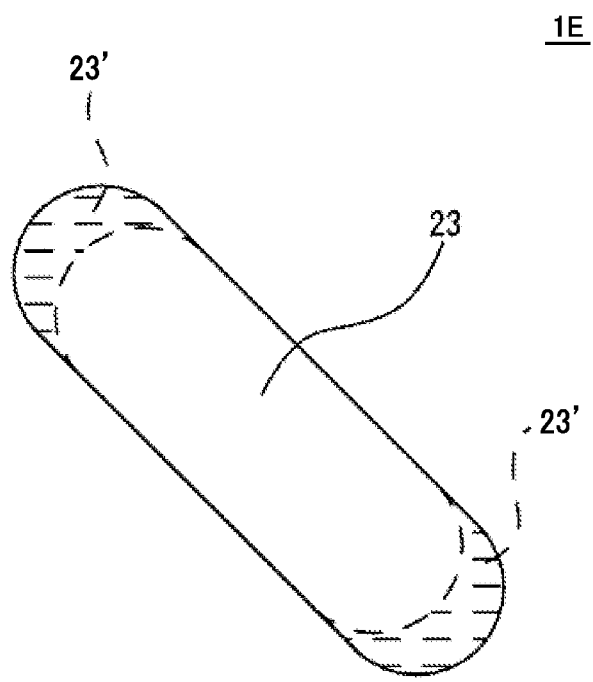
FIG. 15 shows an opening shape of a gas discharge opening provided in the disc-type gas generator shown in FIG. 13.
Figure 16:
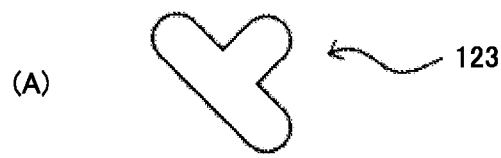
FIG. 16 shows an opening shape of a gas discharge opening in the disc-type gas generator according to a modification based on the fifth embodiment of the present invention.
Figure 16:
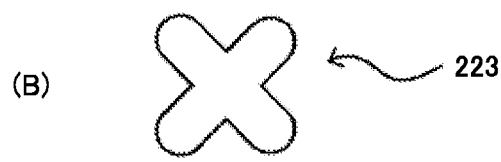
Figure 16:
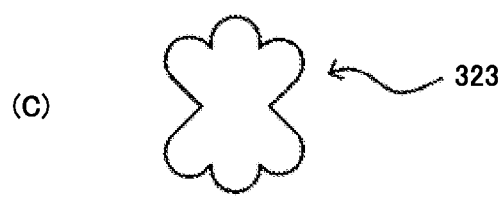
Figure 16:
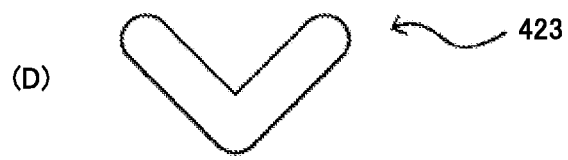

FIG. 15 shows an opening shape of the gas discharge opening provided in the disc-type gas generator shown in FIG. 13. FIG. 16 shows an opening shape of a gas discharge opening in the disc-type gas generator according to a modification based on the present embodiment. Relation between an opening area of the plurality of individual gas discharge openings 23 and breakage of filter 90 will be described below with reference to FIGS. 15 and 16.

Breakage of the filter is more likely as force of sucking out the filter by the gas discharge opening is stronger. Specifically, as a value for S/C is greater, breakage of the filter is more likely.

When a gas discharge opening has an opening shape other than a circle, a fluid is less likely to flow in a corner portion (a nook portion) of that shape, and accordingly a substantial cross-sectional area of a fluid path with respect to the opening area tends to be smaller. Therefore, force of sucking out the filter by the gas discharge opening having the opening shape other than the circle is weaker than that of a gas discharge opening having a circular opening shape.

Specifically, as shown in FIG. 15, when gas discharge opening 23 has an elongated opening shape, a fluid is less likely to flow in a corner portion (a nook portion) shown as being hatched with a reference 23' in the figure. Therefore, force of sucking out filter 90 of gas discharge opening 23 in the elongated opening shape is weaker than that of the gas discharge opening having the circular opening shape.

Based on the expression S/C above, it can be seen that, with a gas discharge opening in an opening shape other than the circle which is longer in circumferential length with respect to an opening area thereof, the value for S/C can be suppressed without increase in number of gas discharge openings. Based on this finding, other opening shapes of a gas discharge opening which do not tend to bring about breakage of a filter include, for example, an opening shape substantially in a T shape like a gas discharge opening 123 shown in FIG. 16 (A), such an opening shape that two elongated holes intersect with each other like a gas discharge opening 223 shown in FIG. 16 (B) (that is, substantially an X opening shape), such an opening shape that three elongated holes intersect with one another like a gas discharge opening 323 shown in FIG. 16 (C) (that is, a shape of an asterisk), and an opening shape substantially in a V shape like a gas discharge opening 423 shown in FIG. 16 (D), although limitation thereto is not intended. Output characteristics of a gas generator are substantially determined by an opening area of a gas discharge opening. Therefore, so long as gas discharge openings are comparable to one another in opening area, output characteristics substantially comparable to those of gas discharge openings in a circular opening shape are obtained even though the gas discharge openings are in an opening shape other than the circle.

Relation of an opening area and a circumferential length of a gas discharge opening with a rupturing pressure of a sealing tape will now be described. A rupturing pressure (an opening pressure) of the sealing tape can be calculated in an expression below as already set forth above.

(Rupturing pressure of sealing tape)=(shear strength of sealing tape)×(thickness of sealing tape)× (circumferential length of gas discharge opening)/(opening area of gas discharge opening)

Based on the expression, in the case of a gas discharge opening in a circular opening shape, when an opening area of the gas discharge opening is determined, a circumferential length of the gas discharge opening is determined at the same time. Therefore, when the sealing tape has prescribed shear strength, a rupturing pressure of the sealing tape is also automatically determined. In the case of a gas discharge opening in an opening shape other than the circle (in the present embodiment), a circumferential length of the gas discharge opening with respect to an opening area of the gas discharge opening can be selected. Therefore, a rupturing pressure of the sealing tape can variously be changed based on the expression. Therefore, since a rupturing pressure of the sealing tape and an opening area of the gas discharge opening can be selected substantially freely without increase in number of gas discharge openings to be provided, ignitability at a low temperature of disc-type gas generator 1E can be improved.

As is clear from the description above, with disc-type gas generator 1E as in the present embodiment, even though an opening area of individual gas discharge opening 23 is set as in the conventional example, reduction in weight and cost can be achieved while breakage of filter 90 at the time of activation is suppressed. According to the construction, adjustment of a rupturing pressure which could not be achieved with a gas discharge opening simply in a circular opening shape can readily be made by varying a circumferential length of gas discharge opening 23 with respect to an opening area thereof.

All of a plurality of gas discharge openings provided in a disc-type gas generator do not have to be in an opening shape other than a circle. When at least one of a plurality of gas discharge openings provided in a disc-type gas generator is in an opening shape other than a circle as well, an effect to a considerable extent can be obtained.

In that case, when two or more gas discharge openings are in an opening shape other than a circle, at least one gas discharge opening in a circular opening shape may be provided at a position between two gas discharge openings. For example, disc-type gas generator 1C in the third embodiment described above represents such a construction example.

(First Verification Test)

In a first verification test, disc-type gas generator 1E constructed as shown in FIGS. 13 and 14 in which the upper shell had a thickness of 1.2 [mm] and all of the plurality of gas discharge openings were modified to gas discharge openings 223 in an opening shape shown in FIG. 16 (B) was defined as an Example A (a disc-type gas generator to which the present invention was applied). Disc-type gas generator 1E constructed as shown in FIGS. 13 and 14 in which the upper shell had a thickness of 1.2 [mm] and all of the plurality of gas discharge openings had a circular opening shape was defined as a Comparative Example A (a conventional gas generator). Difference in number of gas discharge openings when Example A and Comparative Example A were designed to be comparable to each other in total opening area $S_{ALL}$ [mm$^2$] of the gas discharge openings so as to obtain substantially the same output characteristics while the sealing tape would break at a comparable rupturing pressure was studied. An amount of gas generation was set to 2 [mol] in both of Example 0.4 and Comparative Example A. Table 1 below shows results of calculation.

TABLE 1

| Shape of Gas Discharge Opening | Example A Substantially X | Comparative Example A Circular |
|---|---|---|
| Total Opening Area $S_{ALL}$ [mm$^2$] of Gas Discharge Openings | 114.89 | 115.45 |
| Opening Area S [mm$^2$] of Gas Discharge Opening/Circumferential Length C [mm] of Gas Discharge Opening | 0.45 (7.18/16.11) | 0.44 (2.41/5.50) |
| The Number of Gas Discharge Openings [Count] | 16 | 48 |

As is clear from the results of calculation shown in Table 1, it is understood that, as compared with a Comparative Example A, Example A can be ⅓ in number of gas discharge openings, although total opening area $S_{ALL}$, of the gas discharge openings is comparable.

(Second Verification Test)

In the second verification test, a plurality of disc-type gas generators different only in opening shape of gas discharge openings were actually prototyped and an experiment for checking how difference in opening shape of the gas discharge openings would affect the filter was conducted. Five types in total of disc-type gas generators were prototyped, which were examples a, b, and c (disc-type gas generators to which the present invention was applied) and Comparative Examples a and b (conventional gas generators). Specifications of the individual disc-type gas generators are as shown in Table 2 below. Examples a, b, and c and Comparative Examples a and b were designed such that, in order to obtain substantially the same output characteristics, total opening area $S_{ALL}$ [mm$^2$] or the gas discharge openings was set to be comparable and the sealing tape would break at a comparable rupturing pressure.

TABLE 2

| | Specifications of Gas Discharge Opening | | | | | | |
|---|---|---|---|---|---|---|---|
| | Opening Shape | Height [mm] | Width [mm] | Circumferential Length C [mm] | Opening Area S [mm$^2$] | Opening Area S/ Circumferential Length C | Clearance [mm] | Evaluation Result |
| Comparative Example a | Circular | 5.5 | | 17.28 | 23.76 | 1.38 | 2.00 | Filter Broken |
| Comparative Example b | Circular | 2.9 | | 9.11 | 6.61 | 0.73 | 1.50 | Filter Broken |
| Example a | Laterally Elongated Hole | 2.0 | 12.30 | 26.88 | 23.74 | 0.88 | 2.00 | Filter Not Broken |

TABLE 2-continued

| | Specifications of Gas Discharge Opening | | | | | | |
|---|---|---|---|---|---|---|---|
| | Opening Shape | Height [mm] | Width [mm] | Circumferential Length C [mm] | Opening Area S [mm²] | Opening Area S/ Circumferential Length C | Clearance [mm] | Evaluation Result |
| Example b | Laterally Elongated Hole | 1.4 | 3.40 | 8.40 | 4.34 | 0.52 | 1.50 | Filter Not Broken |
| Example c | Laterally Elongated Hole | 2.0 | 6.90 | 16.08 | 12.94 | 0.80 | 1.50 | Filter Not Broken |

The clearance shown in Table 2 refers to a distance between an inner wall surface of the housing in a portion where a gas discharge opening is provided and the outer circumferential surface of the filter (that is, a width of gap 26 shown in FIG. 14 and the like).

FIG. 17 shows a prescribed graph in which values derived from an opening shape of each of the gas discharge openings in the disc-type gas generators according to Examples a, b, and c and Comparative Examples a and b are plotted. In the graph, the ordinate represents (opening area S of gas discharge opening)/(circumferential length C of gas discharge opening) and the abscissa represents opening area S of the gas discharge opening. A value derived from the circular opening shape of the gas discharge opening is plotted on an exponential function expressed with $S/C=0.281 \times S^{0.5}$ in the graph.

As shown in the field of evaluation result in Table 2, breakage of the filter was not observed in Examples a, b, and c in a range satisfying the condition of $S/C \leq 0.27 \times S^{0.5}$ (that is, a region located below an exponential function in the graph expressed with $S/C=0.27 \times S^{0.5}$ as an upper limit line).

On the other hand, breakage of the filter was observed in Comparative Examples a and b located on the condition expressed as $S/C=0.281 \times S^{0.5}$. Thus, it was confirmed that the filter might break when the gas discharge opening had the circular opening shape in an attempt to decrease a clearance for reduction in size of the housing whereas the filter was less likely to break when the gas discharge opening had an opening shape other than the circular shape (that is, a shape satisfying a condition of $S/C \leq 0.27 \times S^{0.5}$). The condition of $S/C \leq 0.27 \times S^{0.5}$ is defined by the exponential function in accordance with the example of the circular shape on the graph shown in FIG. 17.

(Third Verification Test)

In a third verification test, whether or not a disc-type gas generator to which the present invention was applied and which achieved reduction in weight and cost as compared with the conventional example safely operated was checked. Specifically, housings according to Examples 1 to 6 and Comparative Examples 1 and 2 different in plate thickness (thickness) T or total opening area $S_{ALL}$ of gas discharge openings were fabricated and a hydraulic pressure P and an internal pressure Q at high temperature thereof were actually measured. Specification of the individual housings are as shown in Table 3 below. In the housings according to Examples 1 to 6, the gas discharge openings had an opening shape of a laterally elongated hole, and in the housings according to Comparative Examples 1 and 2, the gas discharge openings had a circular opening shape.

TABLE 3

| Specifications | 1.2 [mol] | | | | | 2.0 [mol] | | 3.0 [mol] |
|---|---|---|---|---|---|---|---|---|
| | Example 1 | Example 2 | Example 3 | Example 4 | Comparative Example 1 | Example 5 | Comparative Example 2 | Example 6 |
| Plate thickness T of Housing [mm] | 1.2 | 1.4 | 1.6 | 1.8 | 2.1 | 1.2 | 2.1 | 1.4 |
| Total Opening Area $S_{ALL}$ [mm²] of Gas Discharge Openings | 80 | 69 | 61 | 52 | 39.6 | 116 | 76 | 162 |
| $S_{ALL} \times T$ | 96.0 | 96.6 | 97.6 | 93.6 | 83.2 | 139.2 | 159.6 | 226.8 |
| Safety Factor | 1.70 | 1.63 | 1.64 | 1.66 | 1.62 | 1.63 | 1.63 | 1.68 |
| Hydraulic Pressure P [MPa] | 36 | 41 | 48 | 55 | 62 | 33 | 54 | 34 |
| Internal Pressure Q [MPa] at High Temperature | 18 | 22 | 26 | 30 | 35 | 17 | 30 | 17 |
| Correction Value R [MPa] | 2 | 2 | 2 | 2 | 2 | 2 | 2 | 2 |

Hydraulic pressure P [MPa] represents a pressure at which the housing broke by gradually feeding oil into the housing. Internal pressure Q [MPa] at high temperature represents a maximum value of a pressure generated in the housing as a result of combustion of the gas generating agent when the disc-type gas generator was activated at a very high environmental temperature outside the disc-type gas generator. Since hydraulic pressure P and internal pressure Q at high temperature have empirically been known to vary in value, a correction value R [MPa] is set for each of them.

When a safety factor is defined as (P–R)/(Q–R) with hydraulic pressure P, internal pressure Q at high temperature, and correction value R, the safety factor is preferably not lower than 1.5 and further preferably not lower than 1.6. The safety factor means an "indicator of how much allowance static strength of the housing has for an internal pressure in the housing which may be generated."

As shown in Table 3, it can be understood that the safety factor of the housings according to Examples 1 to 4 in which an amount of gas generation was set to 1.2 [mol] had improved in spite of a small plate thickness of the housing as compared with the housing according to Comparative Example 1 in which an amount of gas generation was similarly set to 1.2 [mol]. This is owing to an effect resulting from change in opening shape of the gas discharge opening from the circular shape to a shape of a laterally elongated hole.

As shown in Table 3, it can be understood that the housing according to Example 5 in which an amount of gas generation was set to 2.0 [mol] was comparable in safety factor to the housing according to Comparative Example 2 in which an amount of gas generation was similarly set to 2.0 [mol] in spite of a small plate thickness of the housing, is again owing to the effect resulting from change in opening shape of the gas discharge opening from the circular shape to the shape of the laterally elongated hole.

Furthermore, as shown in Table 3, it can be understood that the housing according to Example 6 in which an amount of gas generation was set to 3.0 [mol] achieved a sufficient safety factor in spite of a plate thickness of the housing as small as 1.4 mm. This is again owing to the effect resulting from change in opening shape of the gas discharge opening from the circular shape to the shape of the laterally elongated hole.

An approach to increase hydraulic pressure P by increasing a plate thickness of the housing in order to ensure a safety factor not lower than 1.5 has conventionally been adopted. With such an approach, however, though the safety factor is improved, the housing increases in weight, which has been a factor for impeding reduction in weight.

As can be seen in the results, however, by applying the present invention, plate thickness T of the housing can be made smaller to a prescribed value (for example, 1.2 [mm]) while total opening area $S_{ALL}$ of the gas discharge openings is increased to a prescribed value and a safety factor can also be controlled to an appropriate value. Therefore, by applying the present invention, a gas generator which can safely operate and can achieve reduction in weight and cost as compared with the conventional example, where the opening area of the gas discharge openings and the thickness of the housing can sufficiently be balanced, can be obtained.

(Other Forms in Conformity with Fifth Embodiment)

Though an example in which all of the plurality of gas discharge openings provided in the housing are basically identical in shape in the disc-type gas generators according to the fifth embodiment and a modification thereof in the present invention described above has been described by way of example, a shape of some of them may be modified to a shape different from others or the shape may individually be different. A gas discharge opening in a circular opening shape may be included as some of the plurality of gas discharge openings. Gas discharge openings various in opening shape such as gas discharge opening 23 in the opening shape shown in FIG. 15 and gas discharge openings 123, 223, 323, and 423 in the opening shapes shown in FIGS. 16 (A) to (D) may be provided as being combined in a single disc-type gas generator and a gas discharge opening in a circular opening shape may further be combined therewith. According to such a construction, a disc-type gas generator with various output characteristics while it achieves the effects described above can be obtained.

Additionally, though an example in which the present invention is applied to what is called a disc-type gas generator has been described by way of example in the fifth embodiment and the modification thereof of the present invention described above, applications of the present invention are not limited thereto and the present invention can also be applied, for example, to a cylinder-type gas generator.

The embodiments and the modifications thereof disclosed herein are illustrative and non-restrictive in every respect. The technical scope of the present invention is delimited by the terms of the claims and includes any modifications within the scope and meaning equivalent (o the terms of the claims.

REFERENCE SIGNS LIST 1A to 1E gas generator; 10 lower shell; 11 bottom plate portion; 12 circumferential wall portion; 13 protruding cylindrical portion; 14 depression portion; 15 opening; 20 upper shell; 21 top plate portion; 22 circumferential wall portion; 23, 123, 223, 323, 423 gas discharge opening; 23a first gas discharge opening; 23b second gas discharge opening; 23c third gas discharge opening; 24 sealing tape; 24a one end portion; 24b the other end portion; 25 fixing portion; 26 gap; 30 holding portion; 31 inner cover portion; 32 outer cover portion; 33 coupling portion; 34 female connector portion; 35 annular cover portion; 36 lower annular cover portion; 37 upper annular cover portion; 38 step-forming surface; 40 igniter; 41 ignition portion; 42 terminal pin; 50 cup-shaped member; 51 top wall portion; 52 sidewall portion; 53 extension portion; 54 tip end portion; 55 enhancer chamber; 56 enhancer agent; 60 combustion chamber; 61 gas generating agent; 70 lower supporting member; 71 bottom portion; 72 abutment portion; 73 tip end portion; 80 upper supporting member; 81 bottom portion; 82 abutment portion; 85 cushion; 90 filter; and Ra wall region

The invention claimed is:

1. A gas generator comprising:
   a housing having a cylindrical circumferential wall portion provided with a plurality of gas discharge openings and having one end portion and another end portion in an axial direction of the circumferential wall portion closed;
   a gas generating agent arranged in an accommodation space located in the housing;
   an igniter assembled to the housing, for burning the gas generating agent; and
   a sealing member which closes the plurality of gas discharge openings,
   the plurality of gas discharge openings consisting of a plurality of groups of gas discharge openings,
   the plurality of groups of gas discharge openings including only
      at least one first group of first gas discharge openings consisting of a plurality of first gas discharge openings set to be opened at a substantially identical first opening pressure and mutually evenly arranged along a circumferential direction of the circumferential wall portion in rotational symmetry at an angle not greater than 120° around an axial line of the circumferential wall portion, at least one second group of second gas discharge openings consisting of a plurality of second gas discharge openings set to be opened at a substantially identical second opening pressure and mutually evenly arranged along the circumferential direction of the circumferential wall portion in rotational symmetry at an angle not greater than 120° around the axial line of the circumferential wall portion, and at least one third group of third gas discharge openings consisting of a plurality of third gas discharge openings set to be opened at a substantially identical third opening pressure and mutually evenly arranged along the circumferential direction of the circumferential wall portion in rotational symmetry at an angle not greater than 120° around the axial line of the circumferential wall portion, the second opening pressure being higher than the first opening pressure, the third opening pressure being higher than the second opening pressure, and the plurality of gas discharge openings being arranged as not overlapping with each other in the circumferential direction of the circumferential wall portion, wherein the sealing member is formed of at least one sealing tape attached to an inner circumferential surface of the circumferential wall portion, a plurality of wall regions, where a linear dimension between end portions of the plurality of gas discharge openings adjacent in the circumferential direction of the circumferential wall portion is not smaller than 7.0 mm, a pair of end portions of the sealing tape located in a direction of extension are arranged in one of the plurality of wall regions, all of the plurality of gas discharge openings are arranged along the circumferential direction of the circumferential wall portion, and the at least one first group, the at least one second group, and the at least one third group of gas discharge openings are arranged such that the plurality of gas discharge openings that are adjacent one another in the circumferential direction of the circumferential wall portion and that are in different ones of the at least one first group, the at least one second group, and the at least one third group of gas discharge openings are non-uniformly arranged along the circumferential direction of the circumferential wall portion.

2. The gas generator according to claim 1, wherein at least one of the first group of first gas discharge openings, the second group of second gas discharge openings, and the third group of third gas discharge openings are in a shape of an elongated hole greater in opening width along the axial direction of the circumferential wall portion than along the circumferential direction of the circumferential wall portion.

3. The gas generator according to claim 1, wherein all remaining gas discharge openings except for gas discharge openings included in the plurality of third gas discharge openings of the at least one third group of third gas discharge openings are evenly arranged along the circumferential direction of the circumferential wall portion.

4. The gas generator according to claim 1, wherein a sum of opening areas of the at least one first group of first gas discharge openings is smaller than a total sum of a sum of opening areas of the at least one second group of second gas discharge openings and a sum of opening areas of the at least one third group of third gas discharge openings.

5. The gas generator according to claim 1, wherein at least one of the plurality of first gas discharge openings, the plurality of second gas discharge openings, and the plurality of third gas discharge openings are in such a shape that S and C satisfy a condition of $S/C \leq 0.27 \times S^{0.5}$, where S ($mm^2$) represents an opening area of one gas discharge opening of the plurality of gas discharge openings, and C (mm) represents a circumferential length of the one gas discharge opening.

* * * * *